(12) United States Patent
Berlin et al.

(10) Patent No.: US 12,149,518 B2
(45) Date of Patent: *Nov. 19, 2024

(54) CREDENTIAL ENTRY AND MANAGEMENT

(71) Applicant: Apple Inc., Cupertino, CA (US)

(72) Inventors: Jessie Berlin, San Jose, CA (US); Darin Adler, Los Gatos, CA (US); Dan Bernstein, San Francisco, CA (US); Patrick L. Coffman, San Francisco, CA (US); Steven Falkenburg, Los Altos, CA (US); Craig M. Federighi, Los Altos Hills, CA (US); Alan Hshieh, Santa Clara, CA (US); Richard Mondello, San Jose, CA (US); Adele Peterson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,642

(22) Filed: Aug. 29, 2023

(65) Prior Publication Data
US 2023/0412579 A1 Dec. 21, 2023

Related U.S. Application Data

(63) Continuation of application No. 17/578,202, filed on Jan. 18, 2022, now Pat. No. 11,784,992, which is a
(Continued)

(51) Int. Cl.
*H04L 9/40* (2022.01)
*G06F 3/04812* (2022.01)
(Continued)

(52) U.S. Cl.
CPC .......... *H04L 63/08* (2013.01); *G06F 3/04812* (2013.01); *G06F 3/04842* (2013.01); *G06F 21/31* (2013.01)

(58) Field of Classification Search
CPC . H04L 63/08; G06F 3/04812; G06F 3/04842; G06F 21/31
See application file for complete search history.

(56) References Cited

U.S. PATENT DOCUMENTS 9,275,219 B2 * 3/2016 Cross .................... H04L 63/102
9,383,989 B1 * 7/2016 Qi ............................ G06F 8/65
(Continued)

FOREIGN PATENT DOCUMENTS

EP      2801924 A1      11/2014

OTHER PUBLICATIONS

International Preliminary Report on Patentability received for PCT Patent Application No. PCT/US2022/030945, mailed on Dec. 21, 2023, 11 pages.
(Continued)

*Primary Examiner* — Yonas A Bayou
(74) *Attorney, Agent, or Firm* — DLA Piper LLP (US)

(57) ABSTRACT

The present embodiments relate to entry and management of identifiers and credentials. The present embodiments display a credential affordance that, upon selection, provides a credential-assistance user interface for enabling swift access to various credential and management options. The credential affordance can be displayed based on a determination by electronic device that a webpage includes a text entry field associated with a set of one or more restricted resources (e.g., document and/or webpage).

12 Claims, 28 Drawing Sheets

Related U.S. Application Data continuation of application No. 16/773,584, filed on Jan. 27, 2020, now Pat. No. 11,228,576, which is a continuation of application No. 16/111,042, filed on Aug. 23, 2018, now Pat. No. 10,567,365, which is a continuation of application No. 14/869,974, filed on Sep. 29, 2015, now Pat. No. 10,079,815.

(60) Provisional application No. 62/172,220, filed on Jun. 7, 2015.

(51) Int. Cl.
    *G06F 3/04842*     (2022.01)
    *G06F 21/31*     (2013.01)

(56) References Cited

U.S. PATENT DOCUMENTS

| | | | | |
|---|---|---|---|---|
| 9,384,342 | B2* | 7/2016 | Kominar | G06F 21/45 |
| 9,396,323 | B2* | 7/2016 | Cross | H04W 12/06 |
| 9,606,873 | B2* | 3/2017 | Brettell | G06F 11/1464 |
| 9,635,032 | B2* | 4/2017 | Cross | H04L 63/102 |
| 9,825,934 | B1* | 11/2017 | Alexander | H04L 63/0815 |
| 9,847,999 | B2* | 12/2017 | Van Os | H04W 12/06 |
| 9,898,642 | B2* | 2/2018 | Han | H04L 63/083 |
| 9,924,301 | B2* | 3/2018 | Oh | H04N 1/00307 |
| 9,942,234 | B2* | 4/2018 | DeLuca | G06F 21/36 |
| 10,079,815 | B2 | 9/2018 | Berlin et al. | |
| 10,182,048 | B1 | 1/2019 | Sabanayagam | |
| 2008/0244440 | A1* | 10/2008 | Bailey | G06F 40/106 |
| | | | | 715/777 |
| 2014/0157390 | A1* | 6/2014 | Lurey | H04L 63/083 |
| | | | | 726/7 |
| 2016/0359831 | A1 | 12/2016 | Berlin et al. | |
| 2018/0367523 | A1 | 12/2018 | Berlin et al. | |
| 2020/0162445 | A1 | 5/2020 | Berlin et al. | |
| 2022/0141206 | A1 | 5/2022 | Berlin et al. | |
| 2023/0084751 | A1 | 3/2023 | Mondello et al. | |

OTHER PUBLICATIONS

Corrected Notice of Allowance received for U.S. Appl. No. 16/773,584, mailed on Oct. 27, 2021, 4 pages.
Final Office Action received for U.S. Appl. No. 16/111,042, mailed on Aug. 22, 2019, 7 pages.
International Preliminary Report on Patentability received for PCT Patent Application No. PCT/US2016/017032, mailed on Dec. 21, 2017, 8 pages.
International Search Report and Written Opinion received for PCT Patent Application No. PCT/US2016/017032, mailed on May 4, 2016, 11 pages.
International Search Report and Written Opinion received for PCT Patent Application No. PCT/US2022/030945, mailed on Nov. 28, 2022, 19 pages.
Invitation to Pay Additional Fees received for PCT Patent Application No. PCT/US2022/030945, mailed on Oct. 6, 2022, 9 pages.
Non-Final Office Action received for U.S. Appl. No. 14/869,974, mailed on Jul. 28, 2017, 17 pages.
Non-Final Office Action received for U.S. Appl. No. 16/111,042, mailed on Mar. 6, 2019, 10 pages.
Non-Final Office Action received for U.S. Appl. No. 16/773,584, mailed on Aug. 11, 2021, 10 pages.
Non-Final Office Action received for U.S. Appl. No. 17/578,202, mailed on Mar. 2, 2023, 8 pages.
Notice of Allowance received for U.S. Appl. No. 16/111,042, mailed on Oct. 24, 2019, 9 pages.
Notice of Allowance received for U.S. Appl. No. 14/869,974, mailed on Apr. 25, 2018, 11 pages.
Notice of Allowance received for U.S. Appl. No. 16/773,584, mailed on Sep. 17, 2021, 9 pages.
Notice of Allowance received for U.S. Appl. No. 17/578,202, mailed on May 24, 2023, 6 pages.
Ppcharlier, "Feature for auto-concatenating fields (e.g. for OTP based logins)?", Available online at: https://1password.community/discussion/comment/379288/#Comment_379288, Jul. 2017, 5 pages.

\* cited by examiner

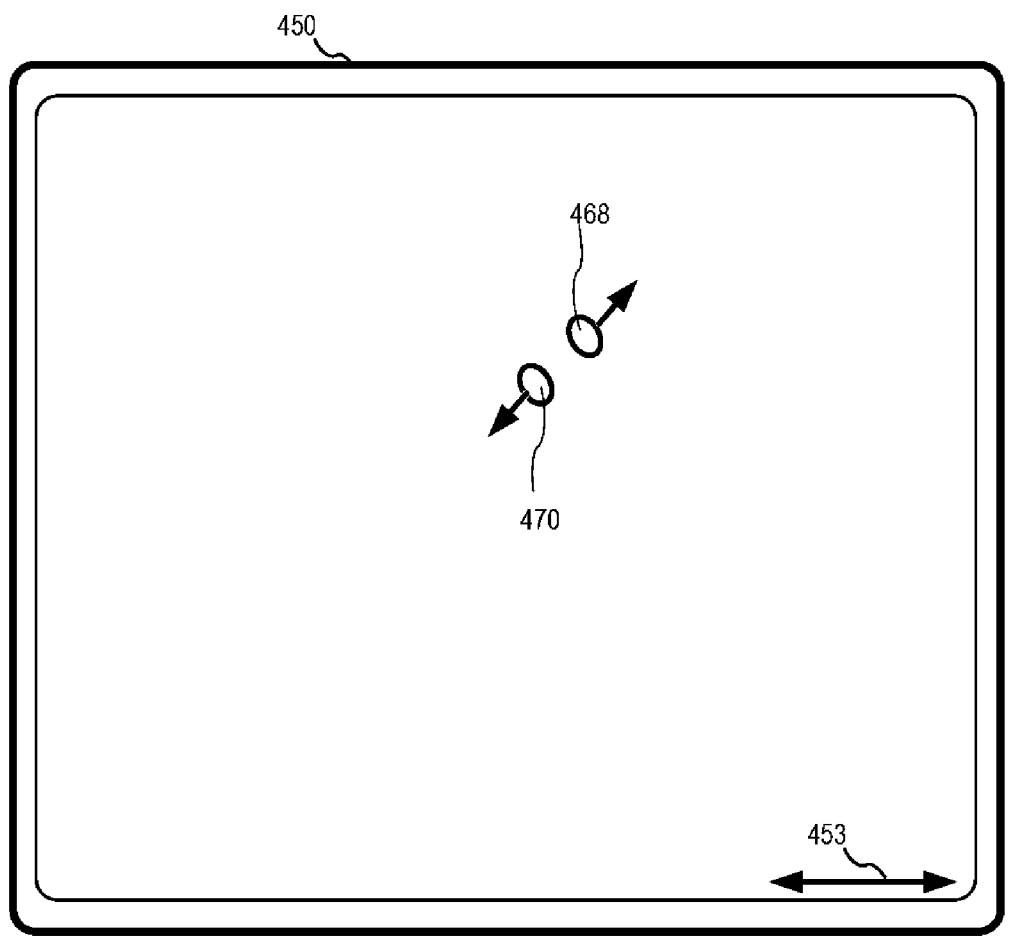
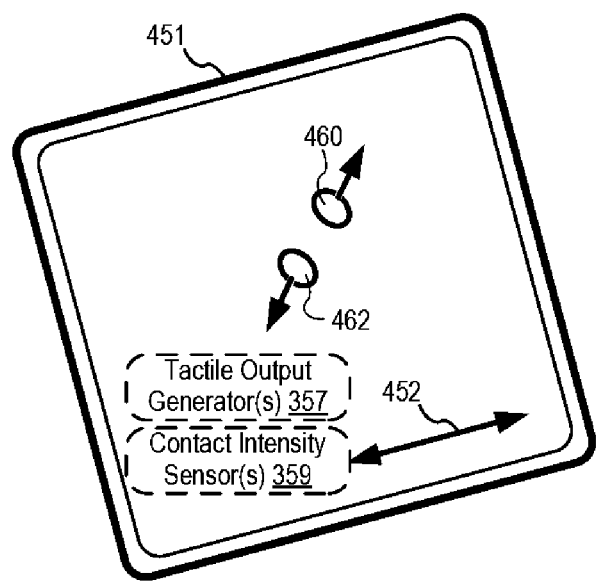
FIG. 4B

700

702
DISPLAY, ON THE DISPLAY, A TEXT ENTRY FIELD ASSOCIATED WITH A SET OF ONE OR MORE RESTRICTED RESOURCES AND A CREDENTIAL AFFORDANCE ASSOCIATED WITH THE TEXT ENTRY FIELD

704
RECEIVING A FIRST INPUT CORRESPONDING TO SELECTION OF THE CREDENTIAL AFFORDANCE

706
IN RESPONSE TO RECEIVING THE FIRST INPUT, DETERMINING WHETHER A CREDENTIAL IS STORED IN THE MEMORY

708
IN ACCORDANCE WITH A DETERMINATION THAT A CREDENTIAL IS NOT STORED IN THE MEMORY, FORGOING DISPLAY OF AN IDENTIFIER IN THE CREDENTIAL-ASSISTANCE USER INTERFACE

710
IN ACCORDANCE WITH A DETERMINATION THAT A CREDENTIAL IS STORED IN THE MEMORY, DISPLAYING AN IDENTIFIER ASSOCIATED WITH THE CREDENTIAL IN THE CREDENTIAL-ASSISTANCE USER INTERFACE

712
RECEIVING AN INPUT CORRESPONDING TO SELECTION OF THE IDENTIFIER

714
IN RESPONSE TO RECEIVING THE INPUT CORRESPONDING TO SELECTION OF THE IDENTIFIER, RETRIEVING THE CREDENTIAL STORED IN THE MEMORY AND ENTERING THE CREDENTIAL INTO THE TEXT ENTRY FIELD

722
RECEIVE A REQUEST TO DISPLAY A DOCUMENT THAT INCLUDES A TEXT ENTRY FIELD

724
IN RESPONSE TO RECEIVING THE REQUEST, DETERMINING WHETHER THE TEXT ENTRY FIELD CORRESPONDS TO A CREDENTIAL ENTRY FIELD FOR WHICH A STORED PASSWORD IS AVAILABLE

726
IN ACCORDANCE WITH A DETERMINATION THAT THE TEXT ENTRY FIELD CORRESPONDS TO A CREDENTIAL ENTRY FIELD FOR WHICH A STORED CREDENTIAL IS AVAILABLE, FILLING IN THE TEXT ENTRY FIELD WITH THE STORED CREDENTIAL

728
IN ACCORDANCE WITH A DETERMINATION THAT THE TEXT ENTRY FIELD CORRESPONDS TO A CREDENTIAL ENTRY FIELD FOR WHICH A STORED CREDENTIAL IS NOT AVAILABLE, DISPLAY, ON THE DISPLAY, A CREDENTIAL AFFORDANCE ASSOCIATED WITH THE TEXT ENTRY FIELD WITHOUT FILLING IN THE TEXT ENTRY FIELD

*FIG. 7B*

CREDENTIAL ENTRY AND MANAGEMENT

CROSS-REFERENCE TO RELATED APPLICATIONS

This application is a continuation of U.S. patent application Ser. No. 17/578,202, entitled "CREDENTIAL ENTRY AND MANAGEMENT," filed Jan. 18, 2022, which is a continuation of U.S. patent application Ser. No. 16/773,584, entitled "CREDENTIAL ENTRY AND MANAGEMENT," filed Jan. 27, 2020, now U.S. Pat. No. 11,228,576, which is a continuation of U.S. patent application Ser. No. 16/111,042, entitled "CREDENTIAL ENTRY AND MANAGEMENT," filed Aug. 23, 2018, now U.S. Pat. No. 10,567,365, which is a continuation of U.S. patent application Ser. No. 14/869,974, entitled "CREDENTIAL ENTRY AND MANAGEMENT," filed Sep. 29, 2015, now U.S. Pat. No. 10,079,815, which claims priority to U.S. Provisional Patent Application No. 62/172,220, entitled "CREDENTIAL ENTRY AND MANAGEMENT," filed Jun. 7, 2015, the content of each of which is hereby incorporated by reference in its entirety for all purposes.

FIELD

The present disclosure relates generally to computer user interfaces, and more specifically to techniques for credential entry and management.

BACKGROUND

Electronic devices may present a credential entry interface in a web browser for secure access to one or more webpages. For example, a user may navigate, in the web browser, to a webpage for accessing secure content. The webpage may request a verification of the user's identity prior to providing access to the secure content. However, electronic devices may be limited in providing a way for entry and management of identifiers and/or credentials, for example, in a web browser.

BRIEF SUMMARY

Some techniques for entry and management of credentials using electronic devices, however, are generally cumbersome and inefficient. For instance, webpages may not always be provided in markup language that unequivocally identifies a credential-based field that would facilitate autofill. Further, for example, existing techniques may use a complex and time-consuming user interface, which may include multiple contact inputs, key presses or keystrokes. Existing techniques require more time than necessary, detracting from the user's experience, and wasting user time and device energy. This latter consideration may be particularly important in battery-operated devices.

Accordingly, the present embodiments provide for electronic devices with faster, more efficient methods and interfaces for entry and management of credentials. Such methods and interfaces optionally complement or replace other methods for entry and management of credentials. Such methods and interfaces reduce the cognitive burden on a user and produce a more efficient human-machine interface. For battery-operated computing devices, such methods and interfaces conserve power and increase the time between battery charges.

The present embodiments provide for methods and/or interfaces that also reduce the number of unnecessary, extraneous, repetitive, and/or redundant inputs, and may create a faster and more efficient user interface arrangement, which may reduce the number of required inputs, reduce processing power, and reduce the amount of time for which user interfaces need to be displayed in order for desired functions to be accessed and carried out.

In accordance with some embodiments, a method is performed at an electronic device including a display and memory: displaying, on the display, a text entry field associated with a set of one or more restricted resources and a credential affordance associated with the text entry field; receiving a first input corresponding to selection of the credential affordance; in response to receiving the first input, displaying a credential-assistance user interface, wherein displaying the credential-assistance user interface includes: in accordance with a determination that a credential is stored in the memory, displaying an identifier associated with the credential in the credential-assistance user interface; and receiving an input corresponding to selection of the identifier; and in response to receiving the input corresponding to selection of the identifier, retrieving the credential stored in the memory and entering the credential into the text entry field.

In accordance with some embodiments, a non-transitory computer-readable storage medium comprises one or more programs for execution by one or more processors of an electronic device, the one or more programs including instructions which, when executed by the one or more processors, cause the electronic device to: display a text entry field associated with a set of one or more restricted resources and a credential affordance associated with the text entry field; receive a first input corresponding to selection of the credential affordance; in response to receiving the first input, display a credential-assistance user interface, wherein displaying the credential-assistance user interface includes: in accordance with a determination that a credential is stored in a memory, display an identifier associated with the credential in the credential-assistance user interface; and receive an input corresponding to selection of the identifier; and in response to receiving the input corresponding to selection of the identifier, retrieve the credential stored in the memory and entering the credential into the text entry field.

In accordance with some embodiments, an electronic device comprises: one or more processors; memory; a display to the one or more processors and memory; and one or more programs stored in memory, the one or more programs including instructions for: displaying, on the display, a text entry field associated with a set of one or more restricted resources and a credential affordance associated with the text entry field; receiving a first input corresponding to selection of the credential affordance; in response to receiving the first input, displaying a credential-assistance user interface, wherein displaying the credential-assistance user interface includes: in accordance with a determination that a credential is stored in the memory, displaying an identifier associated with the credential in the credential-assistance user interface; and receiving an input corresponding to selection of the identifier; and in response to receiving the input corresponding to selection of the identifier, retrieving the credential stored in the memory and entering the credential into the text entry field.

In accordance with some embodiments, a method is performed at an electronic device including a display and memory: receiving a request to display a document that includes a text entry field; in response to receiving the request, displaying the document with the text entry field, wherein displaying the document with the text entry field includes: in accordance with a determination that the text entry field corresponds to a credential entry field for which a stored credential is available, filling in the text entry field with the stored credential; and in accordance with a determination that the text entry field corresponds to a credential entry field for which a stored credential is not available, displaying, on the display, a credential affordance associated with the text entry field without filling in the text entry field. Further, the method may be implemented as part of or within a system, apparatus, and/or computer-readable medium.

In accordance with some embodiments, a non-transitory computer-readable storage medium comprises one or more programs for execution by one or more processors of an electronic device, the one or more programs including instructions which, when executed by the one or more processors, cause the electronic device to: receive a request to display a document that includes a text entry field; in response to receiving the request, display the document with the text entry field, wherein displaying the document with the text entry field includes: in accordance with a determination that the text entry field corresponds to a credential entry field for which a stored credential is available, fill in the text entry field with the stored credential; and in accordance with a determination that the text entry field corresponds to a credential entry field for which a stored credential is not available, display a credential affordance associated with the text entry field without filling in the text entry field.

In accordance with some embodiments, an electronic device comprising: one or more processors; memory; a display to the one or more processors and memory; and one or more programs stored in memory, the one or more programs including instructions for: receiving a request to display a document that includes a text entry field; in response to receiving the request, displaying the document with the text entry field, wherein displaying the document with the text entry field includes: in accordance with a determination that the text entry field corresponds to a credential entry field for which a stored credential is available, filling in the text entry field with the stored credential; and in accordance with a determination that the text entry field corresponds to a credential entry field for which a stored credential is not available, displaying, on the display, a credential affordance associated with the text entry field without filling in the text entry field.

Thus, devices are provided with faster, more efficient methods and interfaces for credential entry and management (e.g., in a web browser), thereby increasing the effectiveness, efficiency, and user satisfaction with such devices. Such methods and interfaces may complement or replace other methods for entry of credentials.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7A is a flow diagram of an example process of credential entry and management in accordance with some embodiments.

FIG. 7B is a flow diagram of a further example process of credential entry and management in accordance with some embodiments.

DESCRIPTION OF EMBODIMENTS

Figure 1A:
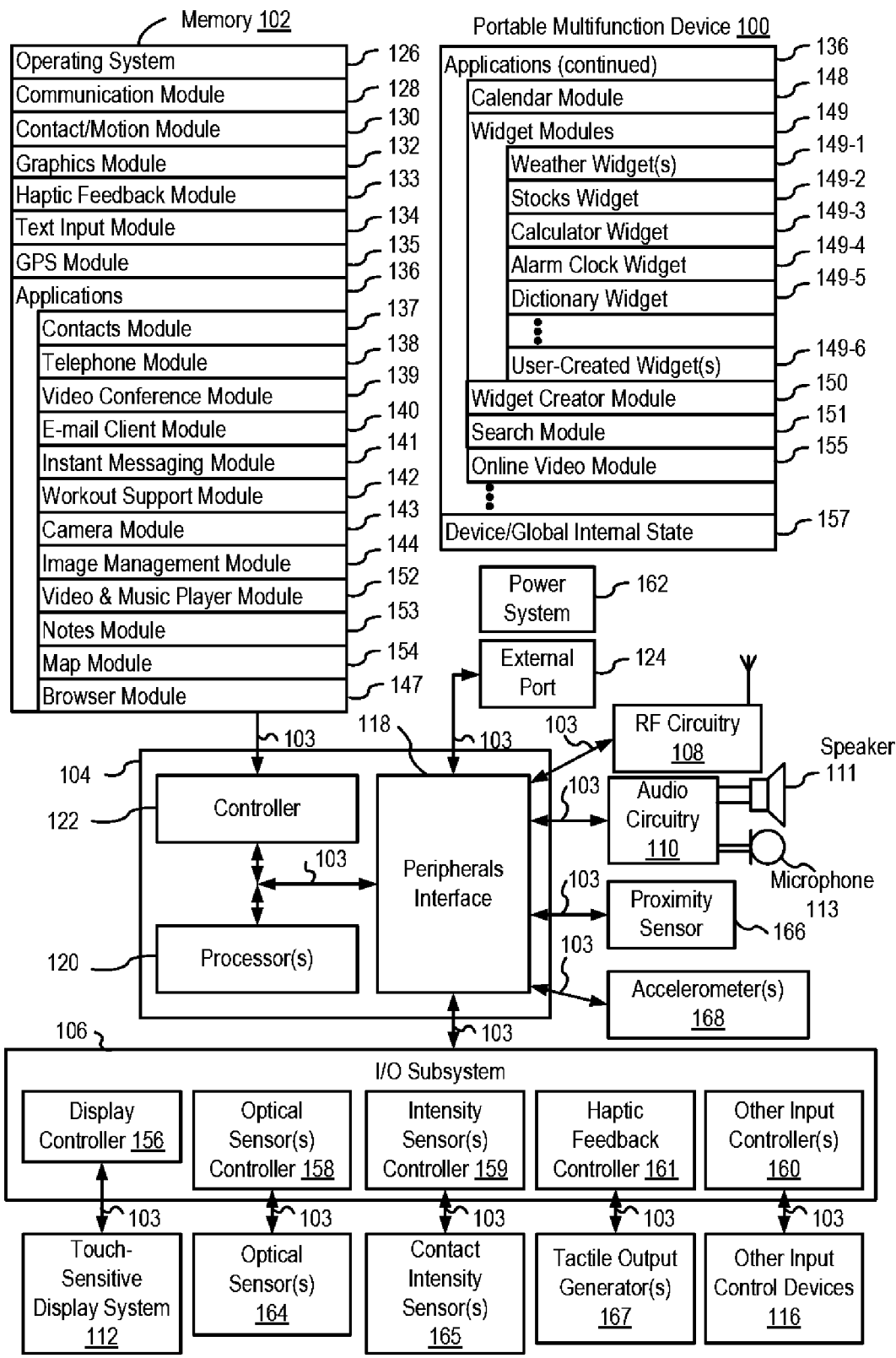
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

The present embodiments generally relate to entry and management of identifiers and credentials. For example, an electronic device such as a mobile device enables a user to navigate to a webpage within a browser interface of a browser application. In some embodiments, the webpage displays a credential entry interface in the browser interface for secure access to secure content within the webpages. That is, the webpage presents the credential entry interface to verify the identity of the user prior to providing access to the secure content.

In some embodiments, upon navigation to a webpage having a credential entry interface for verifying a user's identity and/or permitting access to secure content, the browser interface automatically enters previously-entered and stored identifier and/or credential information in corresponding text entry fields. The foregoing may be referred to as automatically filling in of text entry fields (e.g., "autofill") . However, in some embodiments, the browser interface may not determine, to a degree of certainty, that the webpage includes an identifier and/or credential entry access procedure. In other words, the browser interface may not have detected the login procedure, and hence, did not autofill one or more corresponding text entry fields (e.g., username and/or password fields).

As such, the present embodiments provide enhanced entry and management of credentials. For example, the present embodiments display a credential affordance that, upon selection, provides a credential-assistance user interface for enabling swift access to various credential and management options. In some embodiments, the credential affordance is displayed based on a determination by electronic device that a webpage includes a text entry field associated with a set of one or more restricted resources (e.g., secure document and/or webpage). That is, upon navigating to a webpage, the electronic device displays, in the browser interface, the credential affordance when an autofill failure is detected and/or secure access resources (e.g., username and/or password fields) are detected.

Accordingly, there is a need for electronic devices that provide efficient methods and interfaces for entry and management of identifier and/or credentials, for example, browser interface. Such techniques can reduce the cognitive and/or physical burden on a user in entering and managing credentials in a browser interface, thereby enhancing efficiency and productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for movement between multiple views. FIGS. 6A-6P illustrate exemplary user interfaces for entry and management of credentials. The user interfaces in the figures are also used to illustrate the processes described below, including the process in FIGS. 7A & 7B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" can optionally be construed to mean "when" or "upon" or "in response to determining" or "in response to detecting," depending on the context. Similarly, the phrase "if it is determined" or "if [a stated condition or event] is detected" can optionally be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device can optionally support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 can optionally include one or more computer-readable storage mediums. The computer-readable storage mediums can optionally be tangible and non-transitory. Memory 102 can optionally include high-speed random access memory and can optionally also include non-volatile memory, such as one or more magnetic disk storage devices, flash memory devices, or other non-volatile solid-state memory devices. Memory controller 122 can optionally control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 can optionally be implemented on a single chip, such as chip 104. In some embodiments, they can optionally be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data can optionally be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output can optionally include graphics, text, icons, video, and any combination thereof (collectively termed "graphics"). In some embodiments, some or all of the visual output can optionally correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 can optionally use LCD (liquid crystal display) technology, LPD (light emitting polymer display) technology, or LED (light emitting diode) technology, although other display technologies can optionally be used in some embodiments. Touch screen 112 and display controller 156 can optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 can optionally be analogous to the multi-touch sensitive touchpads described in the following U.S. Pat. No. 6,323,846 (Westerman et al), U.S. Pat. No. 6,570,557 (Westerman et al), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 can optionally be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 can optionally have a video resolution in excess of 100 dpi. In some embodiments, the touch screen has a video resolution of approximately 160 dpi. The user can optionally make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 can optionally include a touchpad (not shown) for activating or deactivating particular functions. In some embodiments, the touchpad is a touch-sensitive area of the device that, unlike the touch screen, does not display visual output. The touchpad can optionally be a touch-sensitive surface that is separate from touch screen 112 or an extension of the touch-sensitive surface formed by the touch screen.

Device 100 also includes power system 162 for powering the various components. Power system 162 can optionally include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 can optionally also include one or more optical sensors 164. FIG. 1A shows an optical sensor coupled to optical sensor controller 158 in I/O subsystem 106. Optical sensor 164 can optionally include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 can optionally capture still images or video. In some embodiments, an optical sensor is located on the back of device 100, opposite touch screen display 112 on the front of the device so that the touch screen display can optionally be used as a viewfinder for still and/or video image acquisition. In some embodiments, an optical sensor is located on the front of the device so that the user's image can optionally be obtained for video conferencing while the user views the other video conference participants on the touch screen display. In some embodiments, the position of optical sensor 164 can be changed by the user (e.g., by rotating the lens and the sensor in the device housing) so that a single optical sensor 164 can optionally be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 can optionally also include one or more proximity sensors 166. FIG. 1A shows proximity sensor 166 coupled to peripherals interface 118. Alternately, proximity sensor 166 can optionally be coupled to input controller 160 in I/O subsystem 106. Proximity sensor 166 can optionally perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 can optionally also include one or more accelerometers 168. FIG. 1A shows accelerometer 168 coupled to peripherals interface 118. Alternately, accelerometer 168 can optionally be coupled to an input controller 160 in I/O subsystem 106. Accelerometer 168 can optionally perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
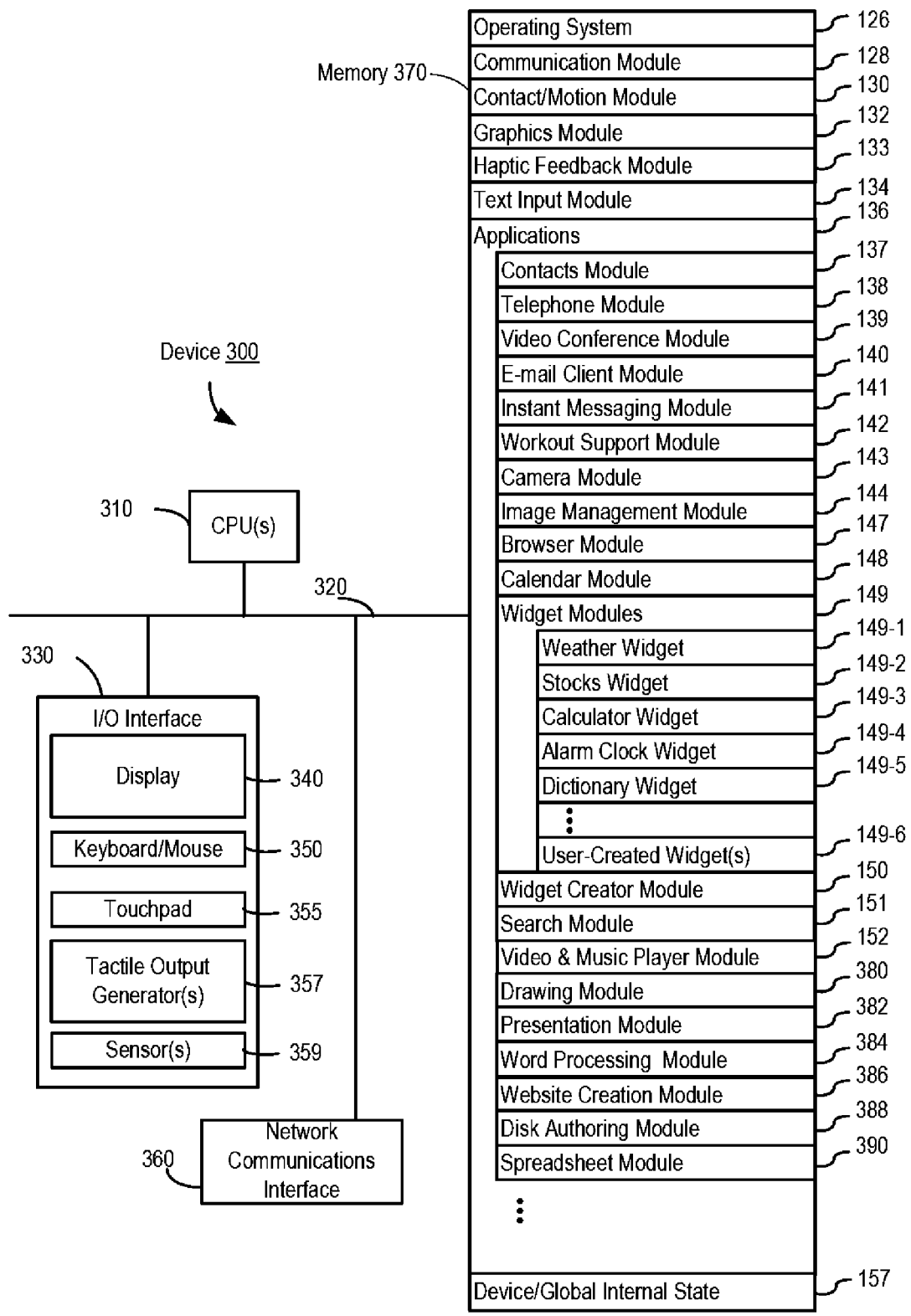
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which can optionally be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 can optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which can optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that can optionally be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 can optionally be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 can optionally be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication can optionally use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages can optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that can optionally be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 can optionally be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 can optionally be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). Executable instructions for performing these functions are, optionally, included in a non-transitory computer-readable storage medium or other computer program product configured for execution by one or more processors. These modules (e.g., sets of instructions) need not be implemented as separate software programs, procedures, or modules, and thus various subsets of these modules can optionally be combined or otherwise rearranged in various embodiments. For example, video player module can optionally be combined with music player module into a single module (e.g., video and music player module 152, FIG. 1A). In some embodiments, memory 102 can optionally store a subset of the modules and data structures identified above. Furthermore, memory 102 can optionally store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some embodiments, the menu button is a physical push button or other physical input control device instead of a touchpad.

Figure 1B:
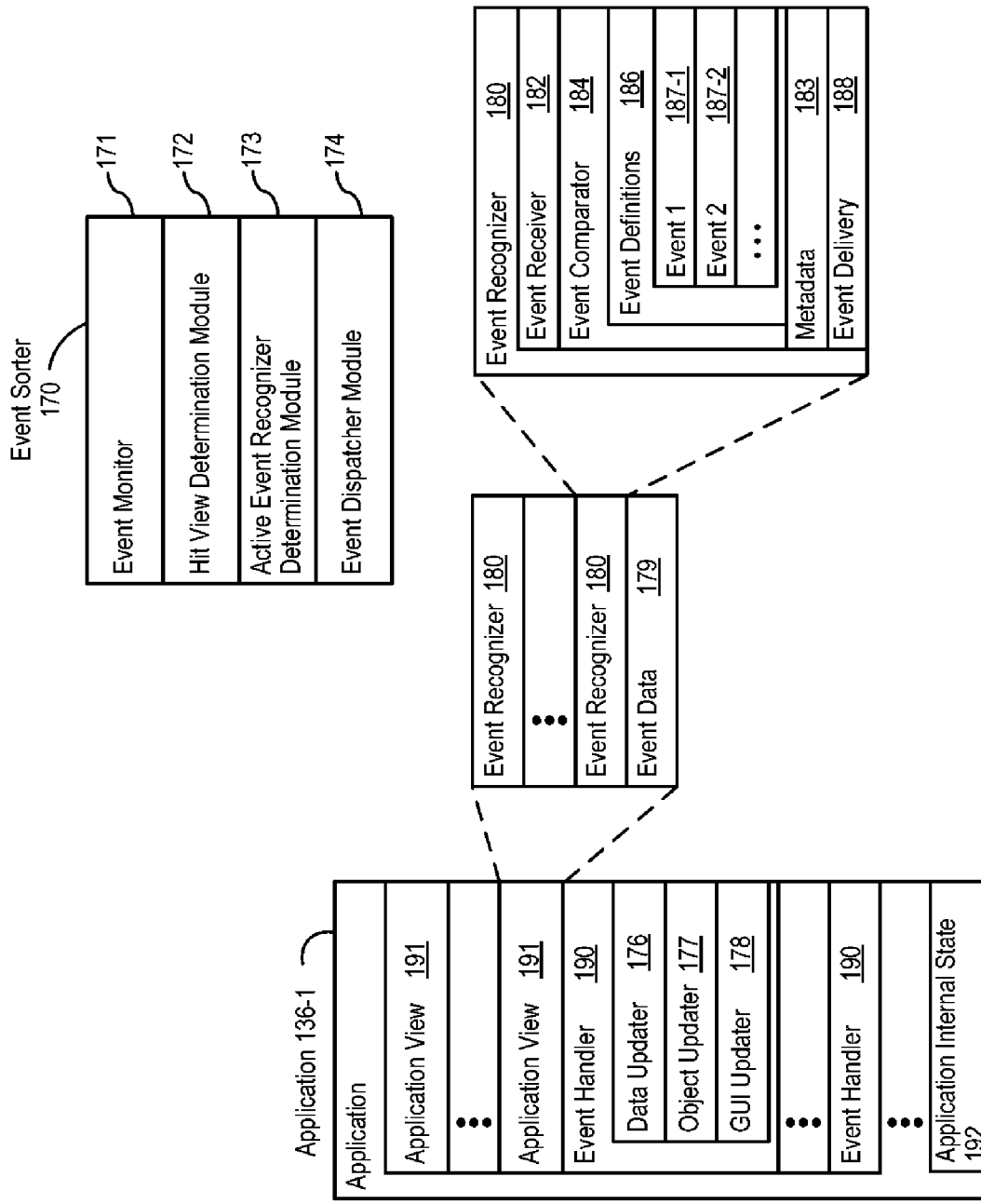
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In some embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected can optionally be called the hit view, and the set of events that are recognized as proper inputs can optionally be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In some embodiments, active event recognizer determination module 173 determines that all views that include the physical location of a sub-event are actively involved views, and therefore determines that all actively involved views should receive a particular sequence of sub-events. In some embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In some embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In some embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 can optionally utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which can optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information can optionally also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In some embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
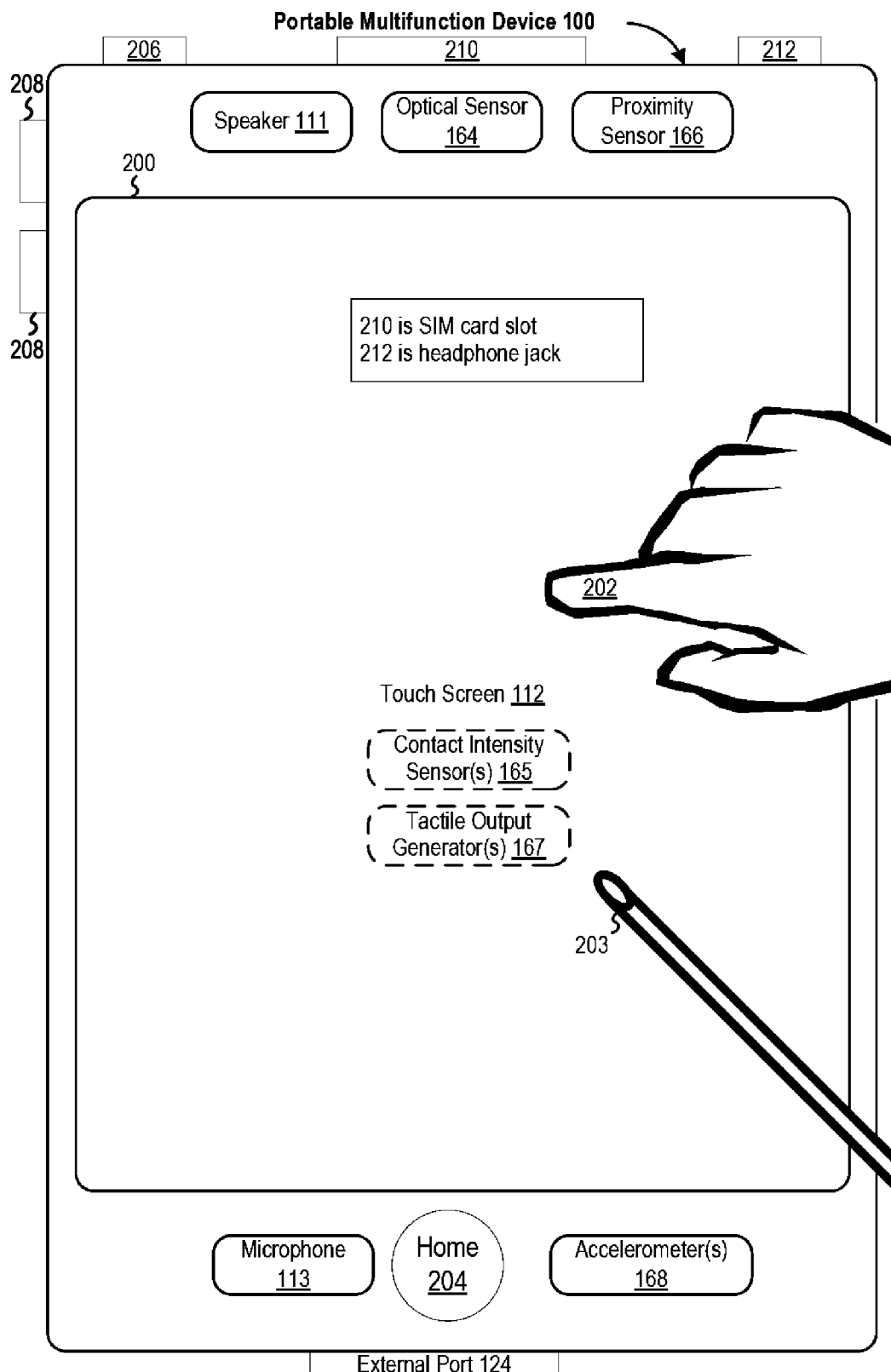
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 can optionally also include one or more physical buttons, such as "home" or menu button 204. As described previously, menu button 204 can optionally be used to navigate to any application 136 in a set of applications that can optionally be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 can optionally be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules can optionally be combined or otherwise rearranged in various embodiments. In some embodiments, memory 370 can optionally store a subset of the modules and data structures identified above. Furthermore, memory 370 can optionally store additional modules and data structures not described above.

Attention is now directed towards embodiments of user interfaces that can optionally be implemented on, for example, portable multifunction device 100.

Figure 4A:
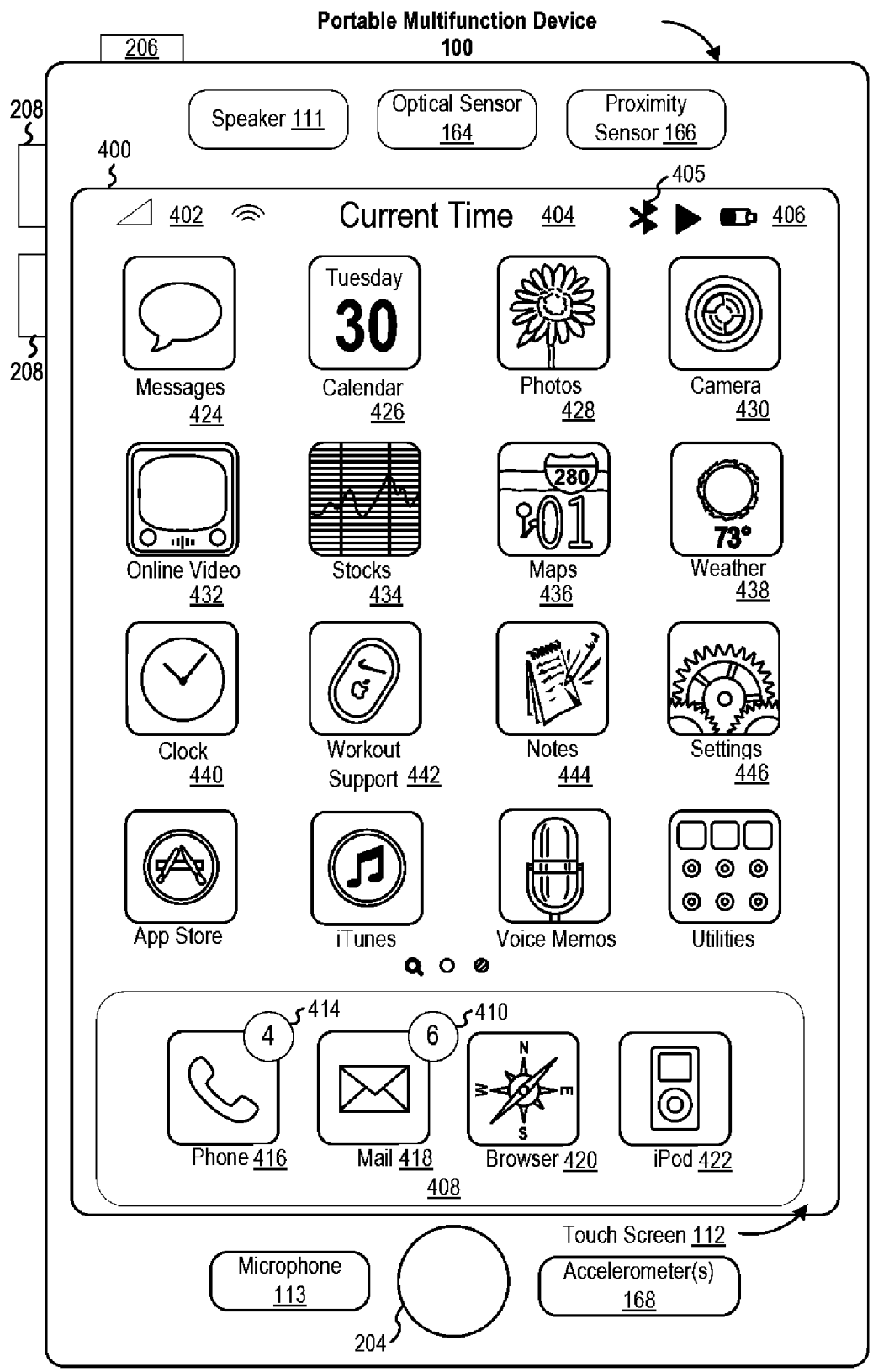
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces can optionally be implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 can optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
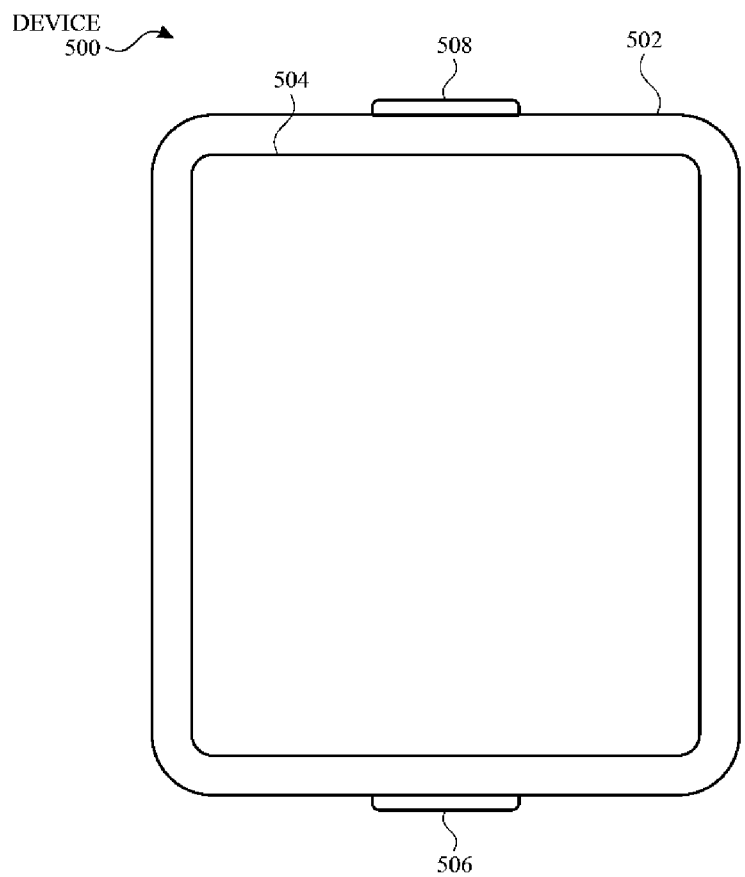
FIG. 5A illustrates a personal electronic device in accordance with some embodiments.
Figure 6A:
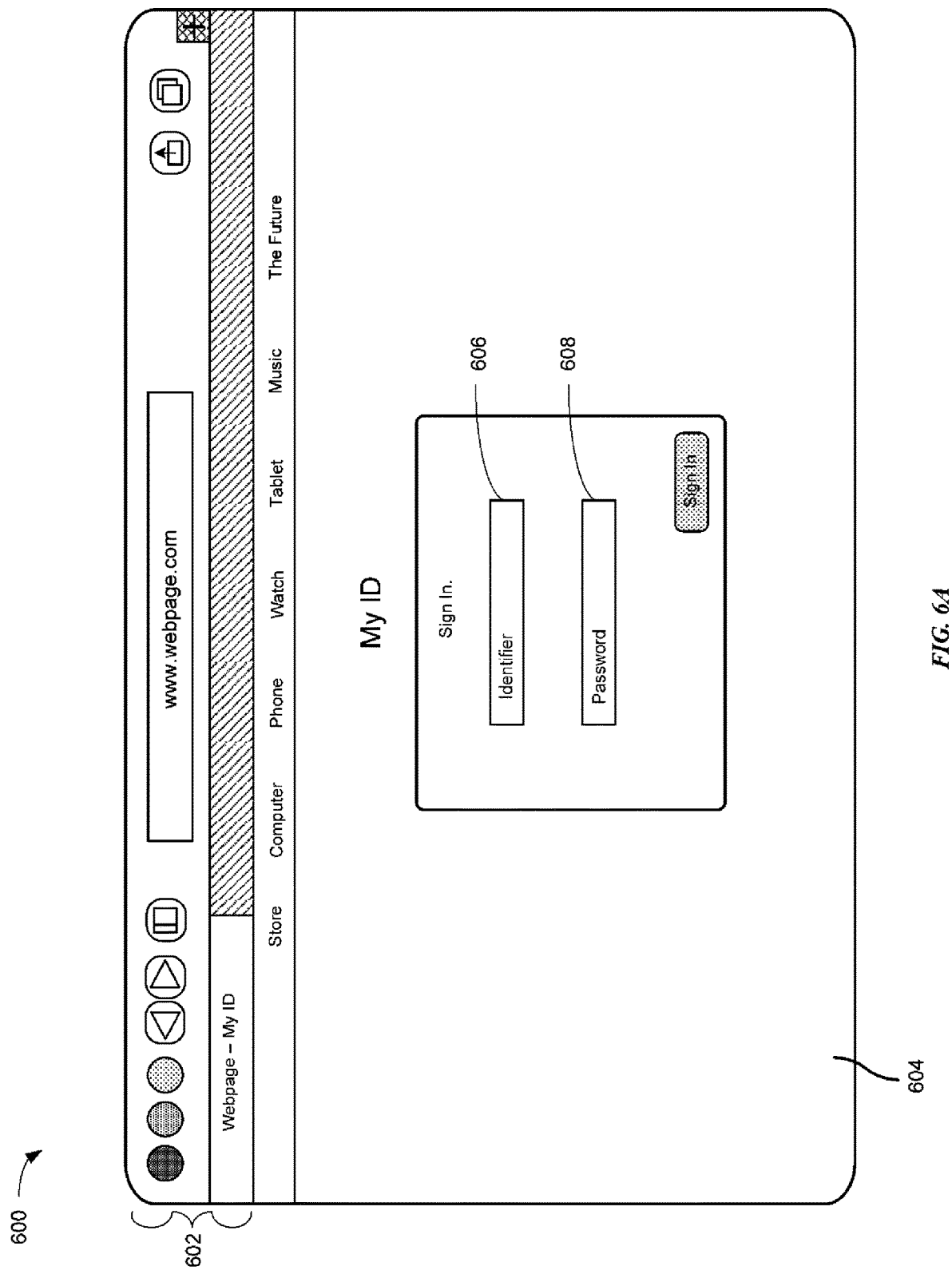
FIG. 6A illustrates an example user interface for credential entry and management in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) can optionally have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
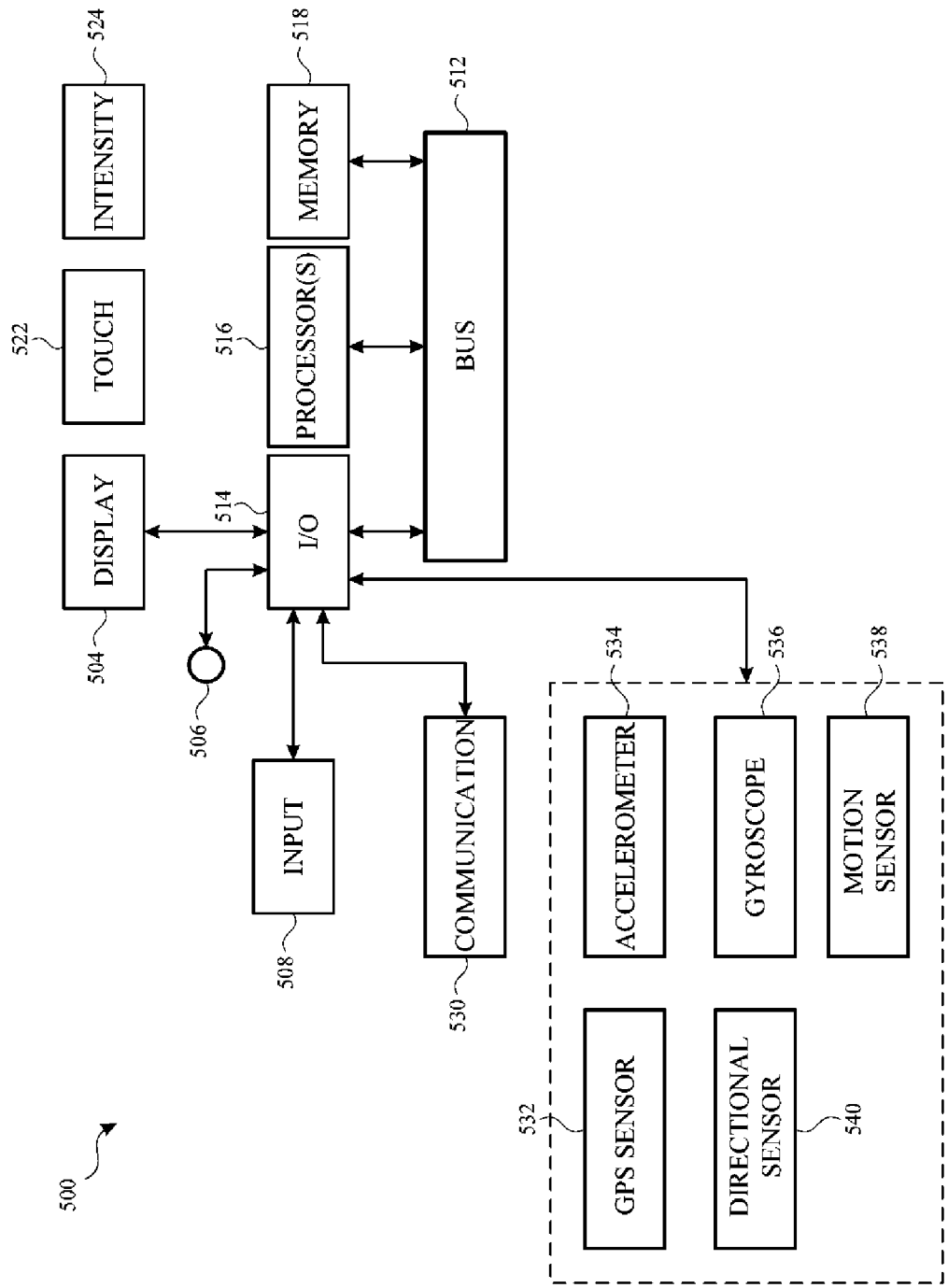
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 can optionally be a rotatable input device or a depressible and rotatable input device, for example. Input mechanism 508 can optionally be a button, in some examples.

Input mechanism 508 can optionally be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 702-712 (FIG. 7). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that can be displayed on the display screen of devices 100, 300, and/or 500 (FIGS. 1, 3, and 5). For example, an image (e.g., icon), a button, and text (e.g., hyperlink) can optionally each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds can optionally include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location can optionally be based on only a portion of the continuous swipe contact, and not the entire swipe contact (e.g., only the portion of the swipe contact at the end location). In some embodiments, a smoothing algorithm can optionally be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface can optionally be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIGS. 6A-6P illustrate example user interfaces for credential entry and management in accordance with some embodiments. For example, an electronic device enables a user to navigate to an interface requiring credentials in order to access restricted resources. In some embodiments, the device autofills the credentials in a text entry field. However, the user may wish to alter the content of the text entry field.

Accordingly, the present embodiments provide control over the credentials entered in a text entry field. Specifically, a credential affordance associated with the text entry field is displayed. In response to receiving input associated with the credential affordance, a credential-assistance user interface is displayed, allowing the user to select a credential stored in memory.

The embodiments of FIGS. 6A-6P are implemented in an electronic device including a display and memory. In some embodiments, electronic device is the same as or similar to portable multifunction device 100 (FIG. 1), multifunction device 300 (FIG. 3), and/or personal electronic device 500 (FIG. 5). Further, in some embodiments, display is the same as or similar to one touch-sensitive display system 112 (FIG. 1), display 340 (FIG. 3), and/or touch-sensitive display screen 504 (FIG. 5). In some embodiments, the memory is the same as or similar to memory 102 (FIG. 1A), memory 370 (FIG. 3), and/or memory 518 (FIG. 5B).

Referring to FIG. 6A, a browser interface 600 is illustrated in accordance with some embodiments. Specifically, browser interface 600 is a browser of a browser application (e.g., Safari released by Apple Inc. of Cupertino, California) for retrieving, presenting and traversing information resources (e.g., webpage content) on the World Wide Web. Browser interface 600 is displayed on a display such as display 112 (FIG. 1), 340 (FIG. 3), and/or 504 (FIG. 5).

Browser interface 600 includes a set of control affordances 602 for enabling navigation and control of the interface. In a non-limiting example, the one or more control affordances 602 include an exit affordance, a previous webpage affordance, a forward webpage affordance, and address bar that includes a current resource locator (URL) and accepts an entered URL that navigates the user to a chosen webpage in browser interface 600.

The electronic device configures browser interface 600 to display a document and/or webpage 604 having a set of one or more restricted resources. In some embodiments, the webpage is a login page for accessing secure content. In particular, in order to provide or grant access to the secure content, the login page requests a user enter an identifier and a credential. In some embodiments, the identifier is a username and the credential is a password. In some embodiments, the identifier is a domain of the webpage. In some embodiments, the set of restricted resources is a document and/or webpage.

Specifically, to enable access to secure content or otherwise allow a user to login or navigate to another (e.g., secured) webpage, electronic device configures browser interface 600 to display a text entry field 608. In some embodiments, text entry field 608 is a credential field, which is also referred to as a password field. Further, browser interface 600 also displays another text entry field in the form of an identifier field 606, which is referred to as a username field, and accepts entry of text associated with an identifier (e.g., username).

In some embodiments, electronic device configures browser interface 600 to automatically fill one or both of the identifier field 606 and the text entry field 608 (e.g., credential/password field). However, in some embodiments, the browser interface 600 does not determine that webpage 604 includes an identifier field 606 and/or text entry field 608 (e.g., credential/password field) associated with a set of one or more restricted resources. For example, browser interface 600 did not detect the login resources in the markup language, and as a result, did not autofill one or both of identifier field 606 and the text entry field 608 (e.g., credential/password field). In another example, while the markup language for a webpage designates a text field as having the PASSWORD attribute (indicating that the value is to be obscured as it is being entered), such fields are known to be used for purposes other than credential entry (e.g., for entry of sensitive data such as birth dates).

Figure 6B:
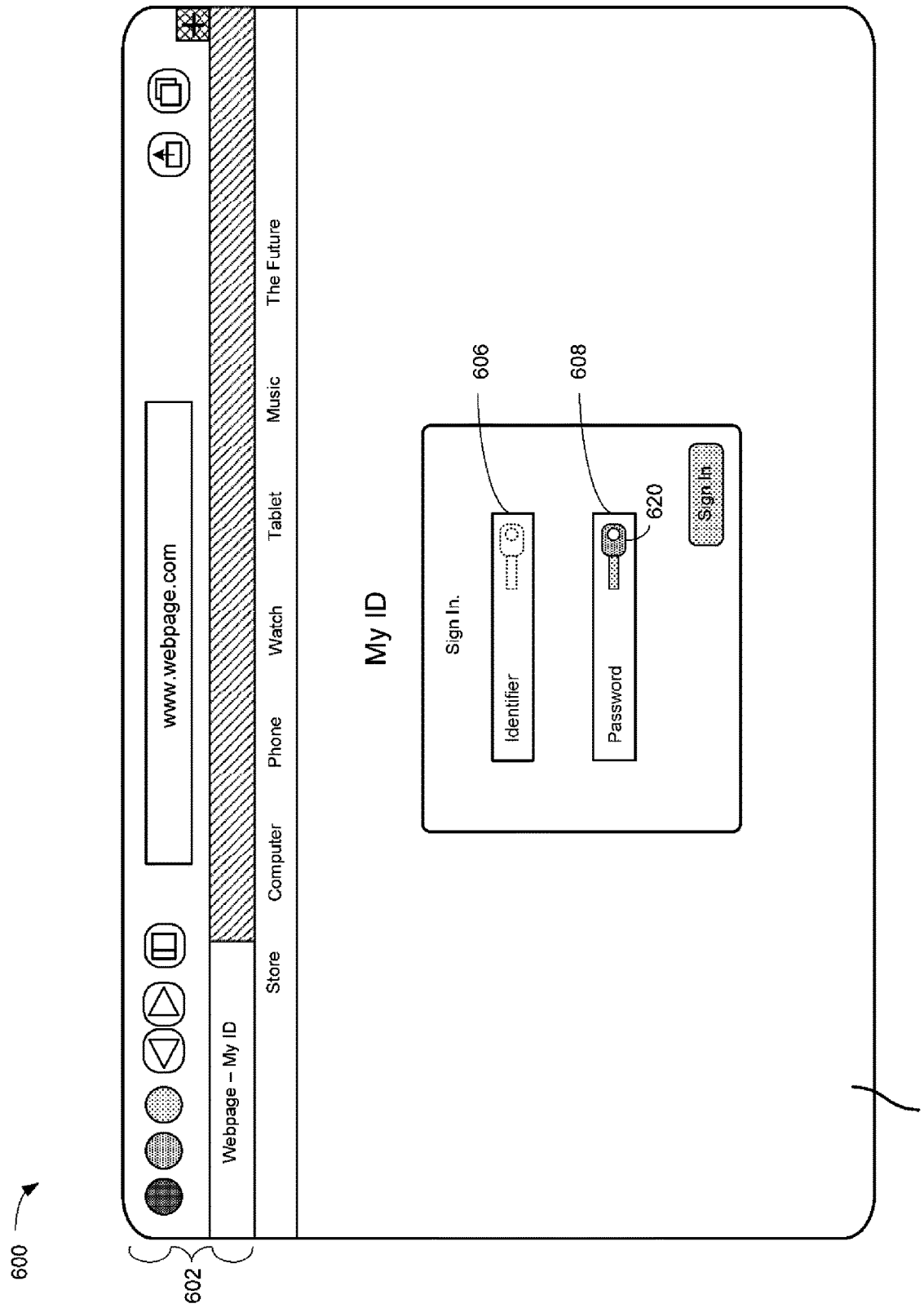
FIG. 6B illustrates another example user interface for credential entry and management in accordance with some embodiments.

As such, referring to FIG. 6B, electronic device configures browser interface 600 to display a credential affordance 620 associated with the text entry field 608. Accordingly, in the event that an autofill procedure does not completely fill one or more text entry fields associated with one or more sets of one or more restricted resources, and/or electronic device determines that the credential affordance 620 is to be displayed for providing more precise entry and management of an identifier and/or credential, the credential affordance 620 is displayed. In some embodiments, credential affordance 620 is displayed even if the autofill procedure completely fills one or more text entry fields, so as to provide the user with a mechanism for accessing alternative content for entry in the field, as described below.

For example, electronic device configures browser interface 600 to display credential affordance 620 based on detecting that the webpage 604 includes a text entry field 608 designated as a password field (e.g., in markup language). Specifically, electronic device configures browser interface 600 to determine whether the document meets a set of one or more credential affordance display criteria. In some embodiments, the credential affordance display criteria are based on at least the document including text entry field 608 designated for secure text entry. In some embodiments, text entry field 608 is text that is not displayed, and as such, is a condition set by markup language.

In some embodiments, the credential affordance 620 is displayed in the text entry field 608 or the identifier field 606. In some embodiments, electronic device configures browser interface 600 to display the credential affordance 620 within or adjacent to the text entry field 608. The foregoing embodiments also apply to the display of credential affordance 620 in the username field 606.

Figure 6C:
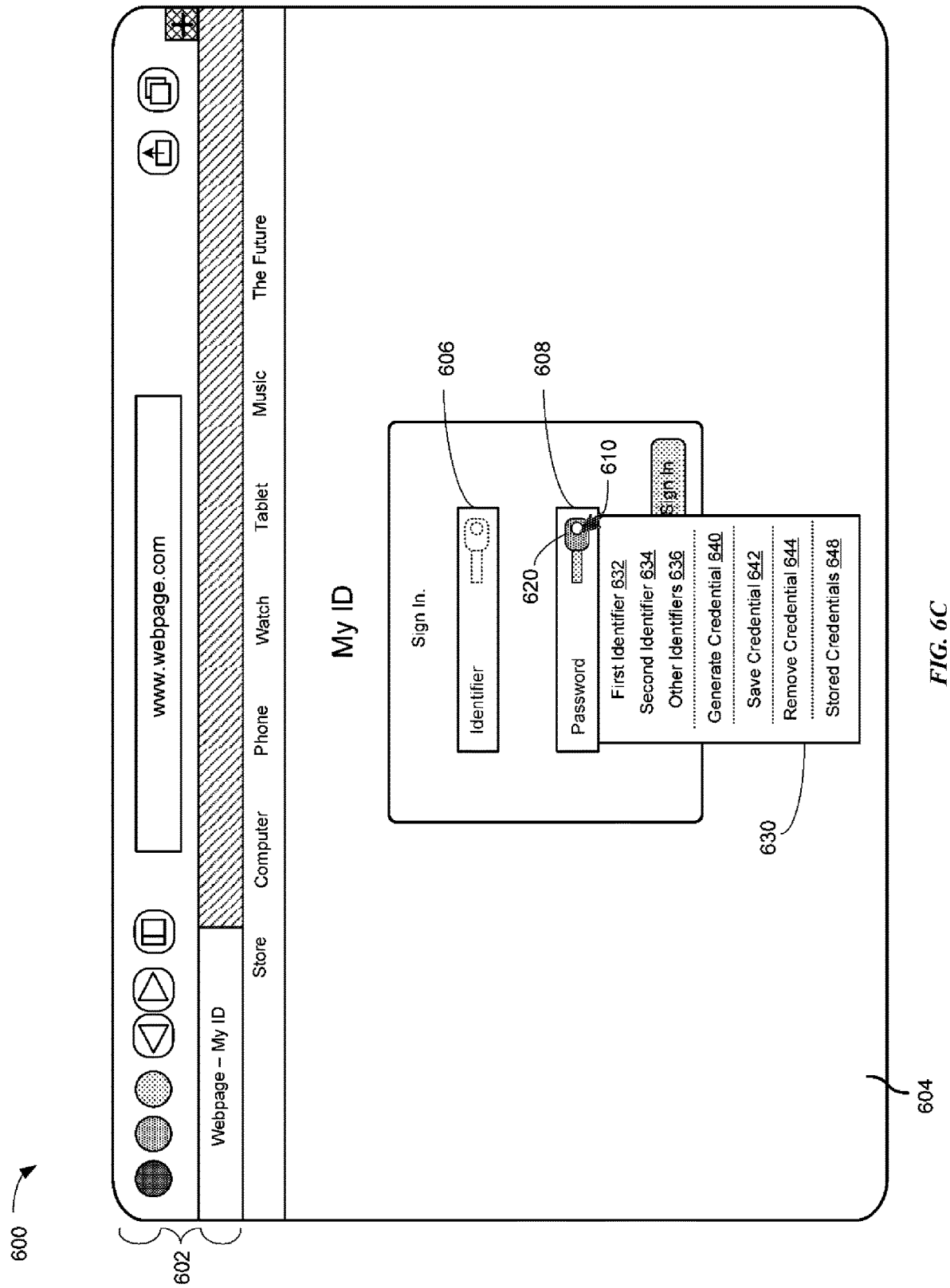
FIG. 6C illustrates a further example user interface for credential entry and management in accordance with some embodiments.

Referring to FIG. 6C, a selection of credential affordance 620 prompts or otherwise triggers a display of credential-assistance user interface 630. As such, browser interface 600, via credential-assistance user interface 630, allows a user to enter and manage one or more identifiers and/or credentials associated with one or more webpages. For example, electronic device and/or browser interface 600 receives a first input 610 corresponding to selection of the credential affordance 620. In some embodiments, the selection is made using a mouse pointer or a contact on a touch-screen device.

Electronic device configures browser interface 600 to display credential-assistance user interface 630 in response to receiving the first input 610. In some embodiments, the credential-assistance user interface 630 is a pop-up window or a menu. In some embodiments, to display the credential-assistance user interface, electronic device configures browser interface 600 to determine whether a credential (e.g., password), associated with the webpage and/or document and associated with an identifier (e.g., domain name or displayable user name), is stored in the memory.

As such, in some embodiments, electronic device configures browser interface 600 to display one or more identifiers such as, but not limited to, first identifier 632 (e.g., John Doe) and second identifier 634 (e.g., www.webpage.com), each of which is associated with one or more credentials in the credential-assistance user interface 630, and in accordance with a determination that the credential is stored in the memory. Otherwise, electronic device configures browser interface 600 to forgo displaying of the identifier in the credential-assistance user interface 630 in accordance with a determination that the credential is not stored in the memory. For example, in the event that at least one credential associated with webpage is not stored in the memory, electronic device configures browser interface 600 to forgo display of first identifier 632 and/or second identifier 634.

In some embodiments, credential-assistance user interface 630 includes one or more affordances for the retrieval, entry and/or management of one or more identifiers (e.g., usernames) and/or credentials (e.g., passwords). For example, credential-assistance user interface 630 includes one or more identifiers of webpage 604 that are associated with a respective webpage, and more specifically, one or more credentials stored in the memory and associated with the webpage 604. In some embodiments, the one or more identifiers include first identifier 632 and second identifier 634, although any number of identifiers are displayed in credential-assistance user interface 630.

In some embodiments, credential-assistance user interface 630 further includes other identifiers affordance 636, which, when selected, causes the device to display one or more identifiers associated with one or more webpages distinct from webpage 604. In some embodiments, credential-assistance user interface 630 further includes generate credential affordance 640, which generates and displays a generated credential (e.g., in concealed form). In some embodiments, credential-assistance user interface 630 further includes save credential affordance 642, which stores an entered credential in the memory.

In some embodiments, credential-assistance user interface 630 further includes remove credential affordance 644, which, when selected, causes the device to remove or delete an entered credential (e.g., and associated identifier) from the memory. In some embodiments, credential-assistance user interface 630 further includes stored credentials affordance 648, which prompts the display to display a list of stored credentials and associated identifiers.

Figure 6D:
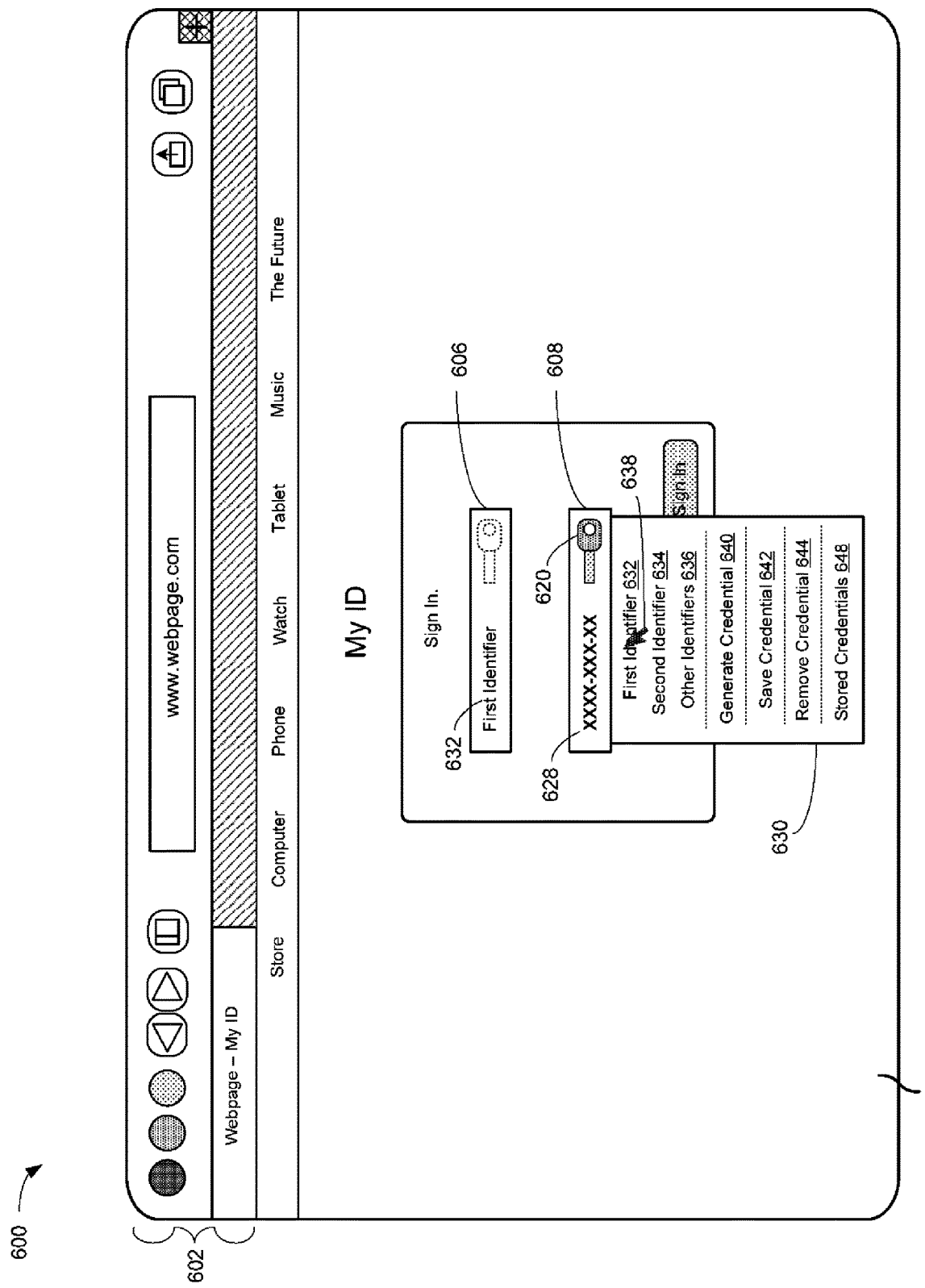
FIG. 6D illustrates an additional example user interface for credential entry and management in accordance with some embodiments.

Referring to FIG. 6D, electronic device configures browser interface 600 to receive an input 638 corresponding to selection of the identifier (e.g., first identifier 632). Further, electronic device configures browser interface 600 to retrieve the credential 628 associated with the identifier stored in the memory and enter the credential 628 into the text entry field 608. Electronic device configures browser interface 600 to correspondingly enter the identifier (e.g., first identifier 632) associated with the credential 628 into the identifier field 606. That is, in response to selecting the identifier (e.g., first identifier 632) in the credential-assistance user interface 630 to enter the associated credential in the text entry field 608 (e.g., password field), electronic device configures browser interface 600 to autopopulate the associated identifier (e.g., first identifier 632) in the identifier field 606 (e.g., username field).

In some embodiments, the actual characters of the credential 628 will not be displayed in text entry field 608. As such, a concealed representation of the credential 628 is displayed in text entry field 608.

Figure 6E:
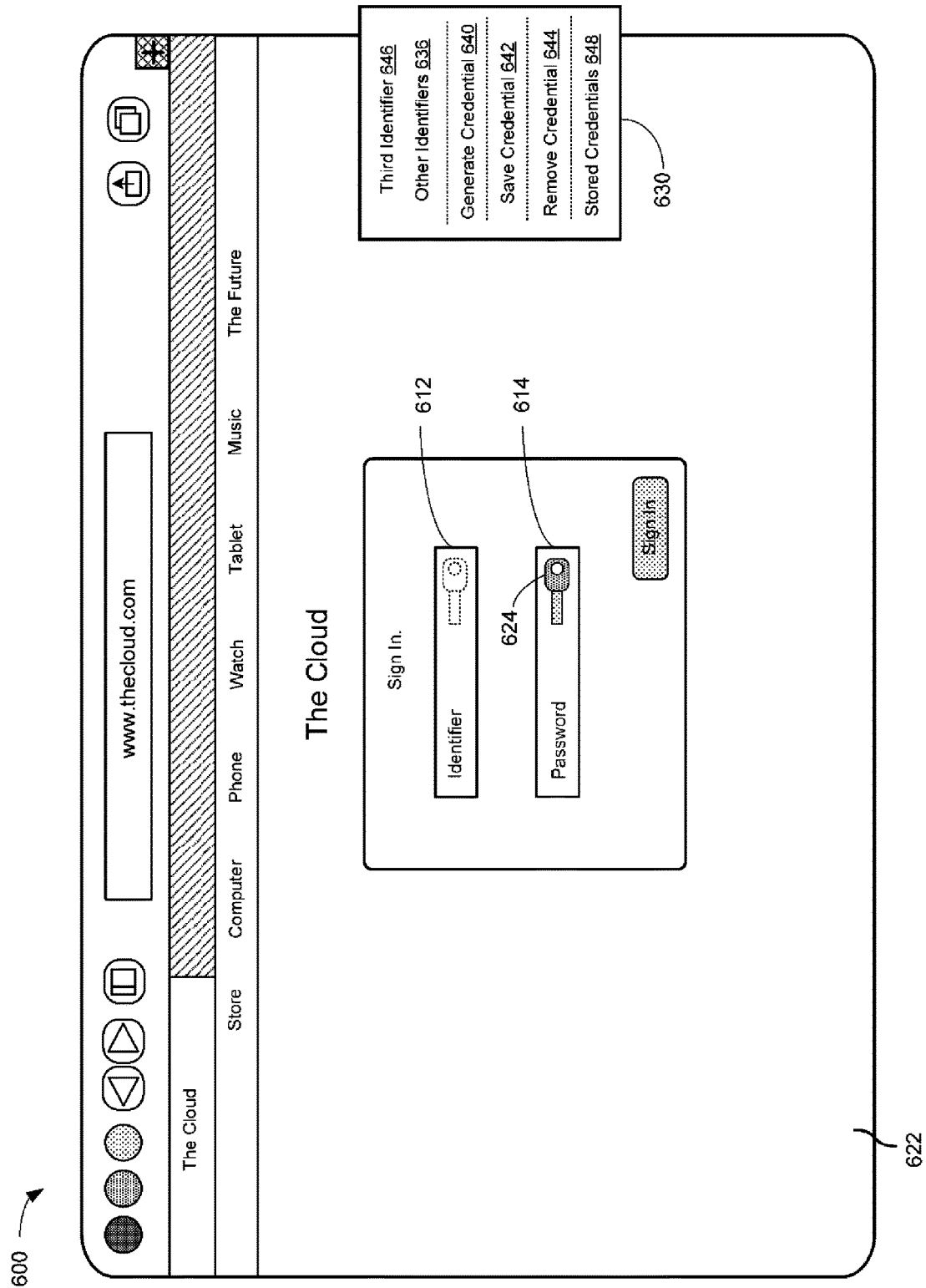
FIG. 6E illustrates an example user interface for credential entry and management in accordance with some embodiments.

Referring to FIG. 6E, electronic device configures browser interface 600 to display a second webpage 622 distinct from the first webpage 604. Second webpage includes a second text entry field 614 and a second identifier field 612. In some embodiments, electronic device configures browser interface 600 to display credential-assistance user interface 630 in a user interface region that is separate from the user interface region that includes the text entry field 614.

Further, once separated, credential-assistance user interface 630 remains separated as the user navigates from one webpage to another webpage (e.g., from webpage 604 to second webpage 622). That is, in some embodiments, credential assistance user interface 630 is persistent if moved after it is prompted and separated, and the contents changes or updates automatically as the browser interface focus changes (e.g., move from one webpage or domain to another webpage or domain). For instance, as the browser interface 600 navigated from the webpage 604 to the second webpage 622, a display of the credential-assistance user interface 630 updated to include a third identifier 646 (e.g., "Jane Smith") associated with a credential of the second webpage 622.

In some embodiments, electronic device configures browser interface 600 to receive a selection of the stored credentials affordance 648. As such, electronic device configures browser interface 600 to display all stored identifier affordances of one or more webpages (e.g., webpage 604 and/or second webpage 622). In some embodiments, electronic device configures browser interface 600 to receive a selection of the stored credentials affordance 648. As such, electronic device configures browser interface 600 to display identifiers associated with one or more webpages distinct from the webpage 604.

In some embodiments, the stored identifiers are displayed along with domains to which they correspond. In some embodiments the stored identifiers are displayed along with an indication of when the stored credential was initially stored or when the credential was last used. In some embodiments, in response to requesting more information about an identifier, the device displays options to use the password associated with the identifier, open a link to a website associated with the identifier, remove the identifier and corresponding credential from storage, and edit the credential and/or the identifier.

Figure 6F:
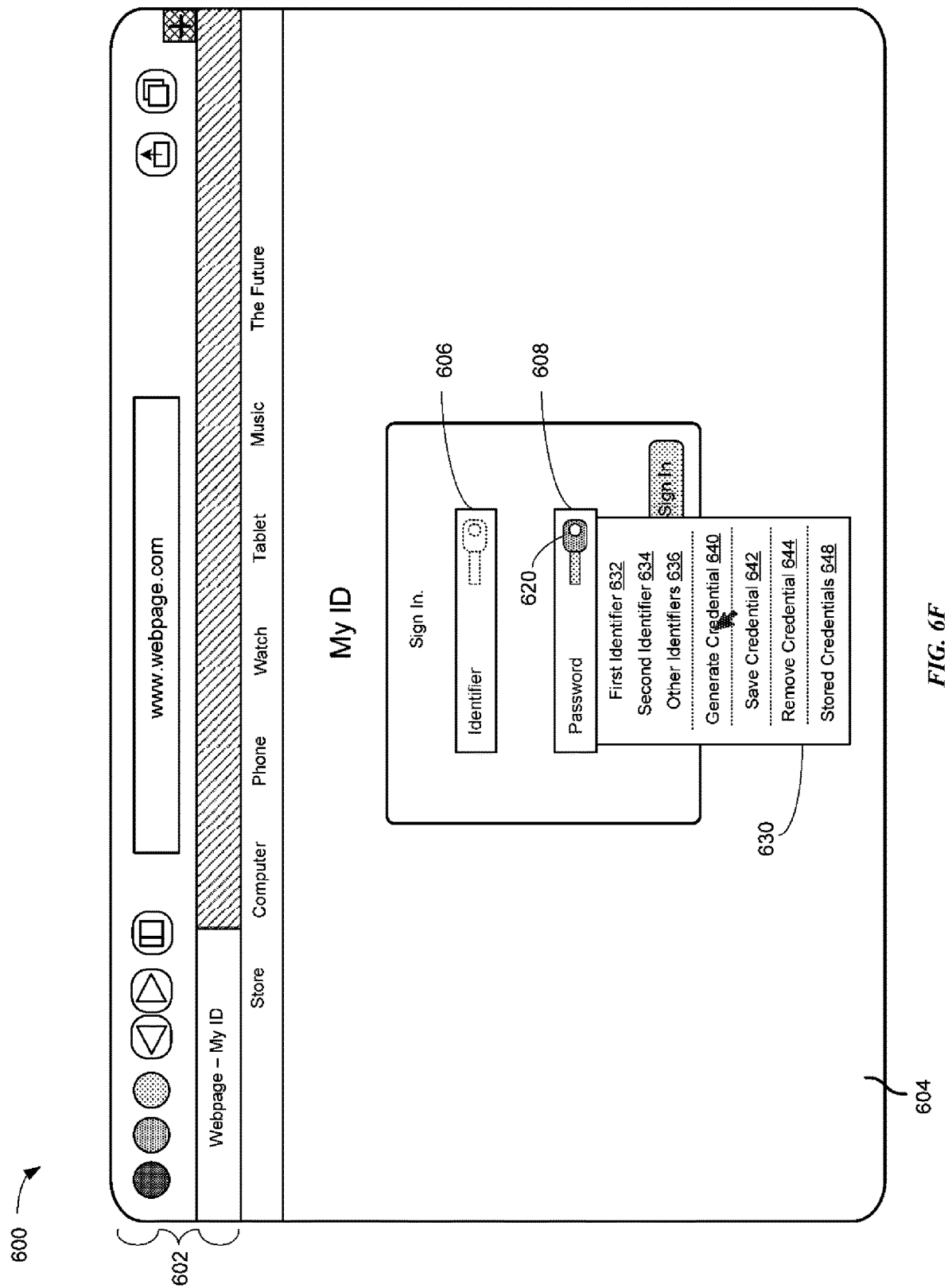
FIG. 6F illustrates an example user interface for credential entry and management in accordance with some embodiments.
Figure 6G:
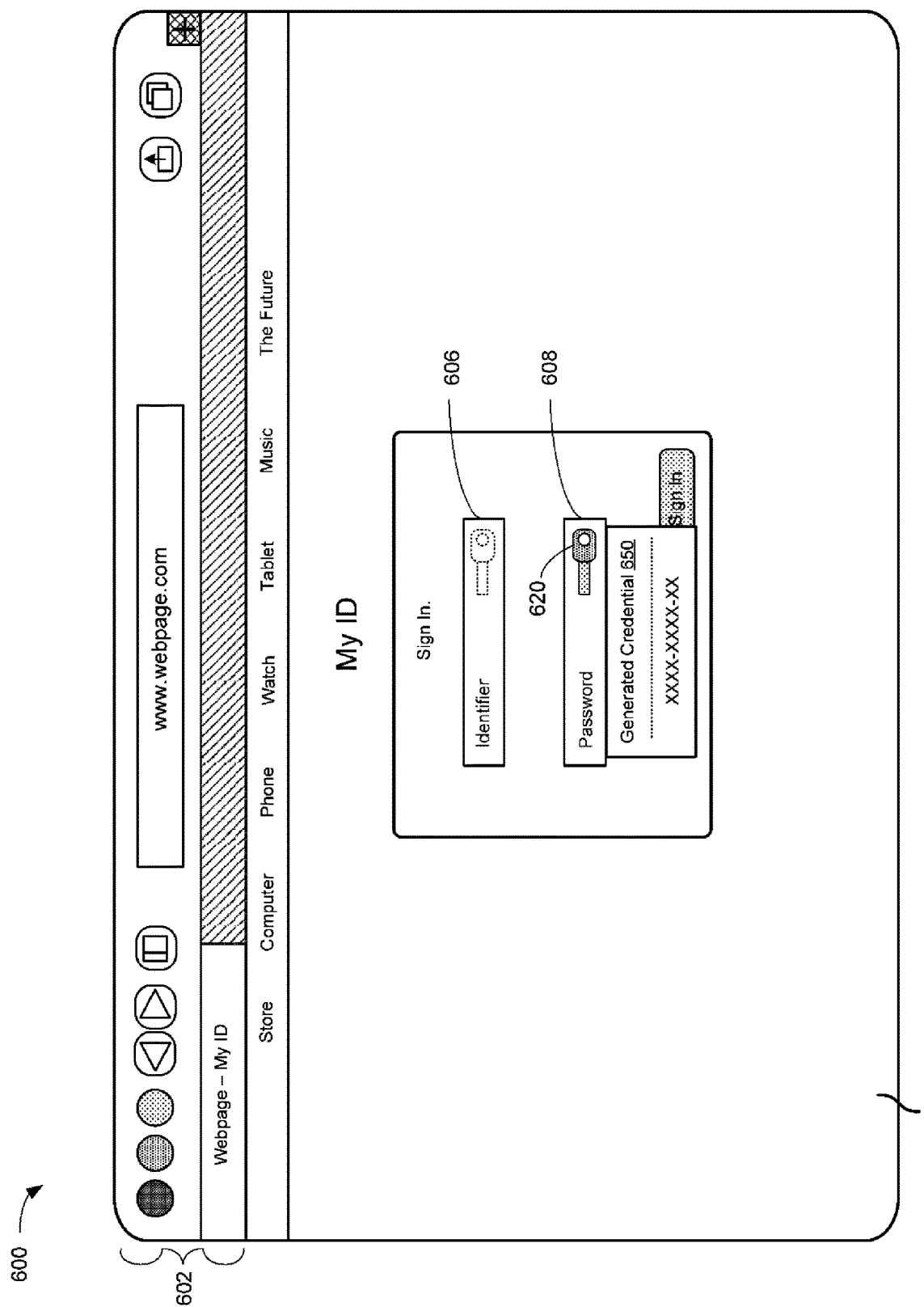
FIG. 6G illustrates an example user interface for credential entry and management in accordance with some embodiments.

Referring to FIGS. 6F and 6G, an example user interface of selecting and generating the generate credential affordance 640 is illustrated in accordance with some embodiments. Specifically, browser interface 600 receives an input corresponding to a selection of the generate credential affordance 640. Electronic device configures browser interface 600 to generate and display a generated credential 650. In some embodiments, the generated credential 650 is a secure password generated automatically without further input from the user. The user then selects the generated credential 650 and, in response to the selection, electronic device configures browser interface 600 to associate the generated credential 650 with an entered identifier (e.g., username) and store the generated credential 650 in memory.

Figure 6H:
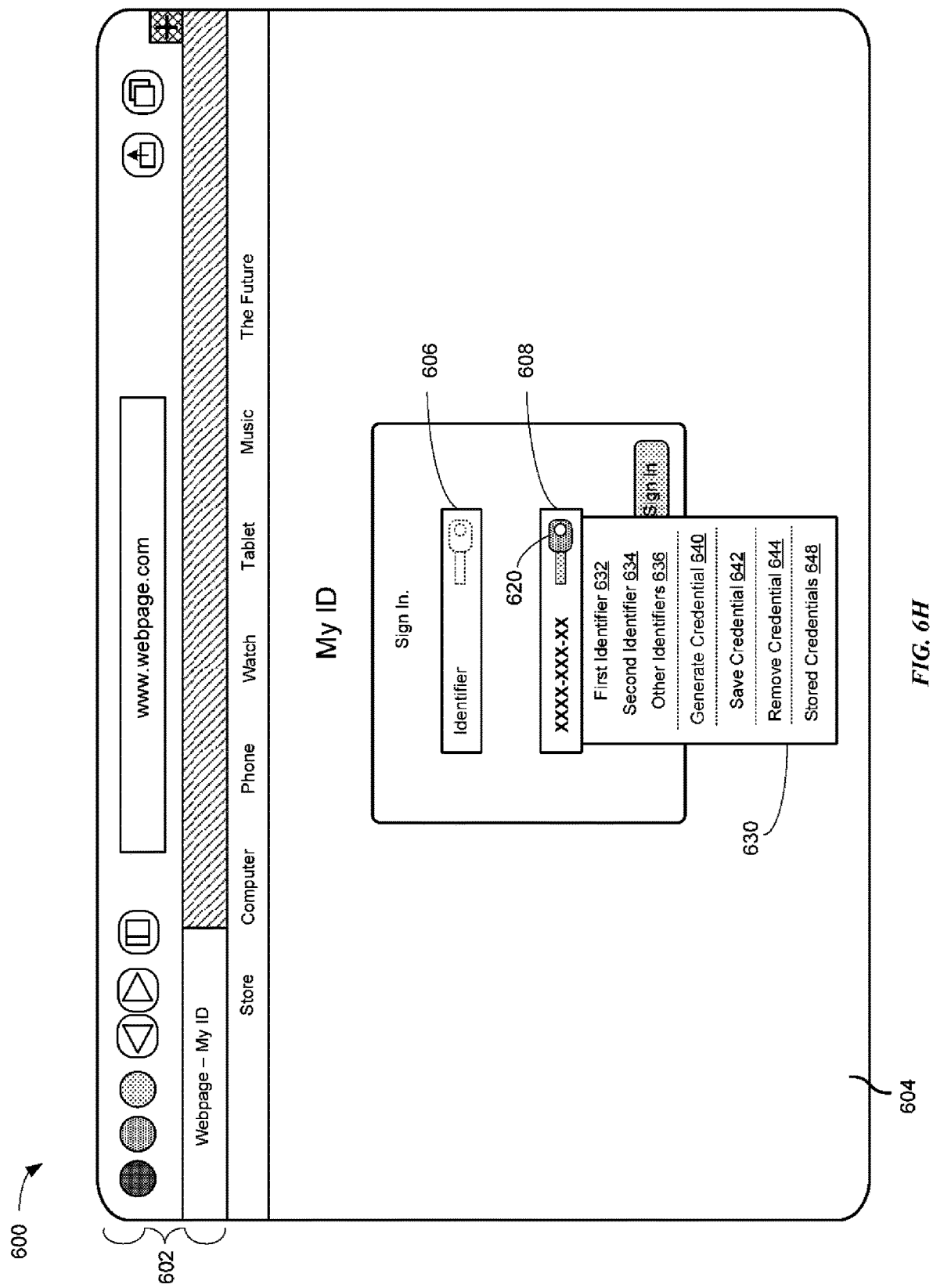
FIG. 6H illustrates an example user interface for credential entry and management in accordance with some embodiments.

In some embodiments, as shown in FIG. 6H, electronic device configures browser interface 600 to forgo display of generate credential affordance 640 if text has been entered in the text entry field 608 (e.g., credential/password field). For example, electronic device configures browser interface 600 to display a plurality of password options without displaying an active option for generating a new credential based on a determination that text has been entered in the text entry field 608. In some embodiments, the appearance of the generate credential affordance 640 is grayed-out if text has been entered in the text entry field 608. In some embodiments, the generate credential affordance 640 is disabled if text has been entered in the text entry field 608.

Figure 6I:
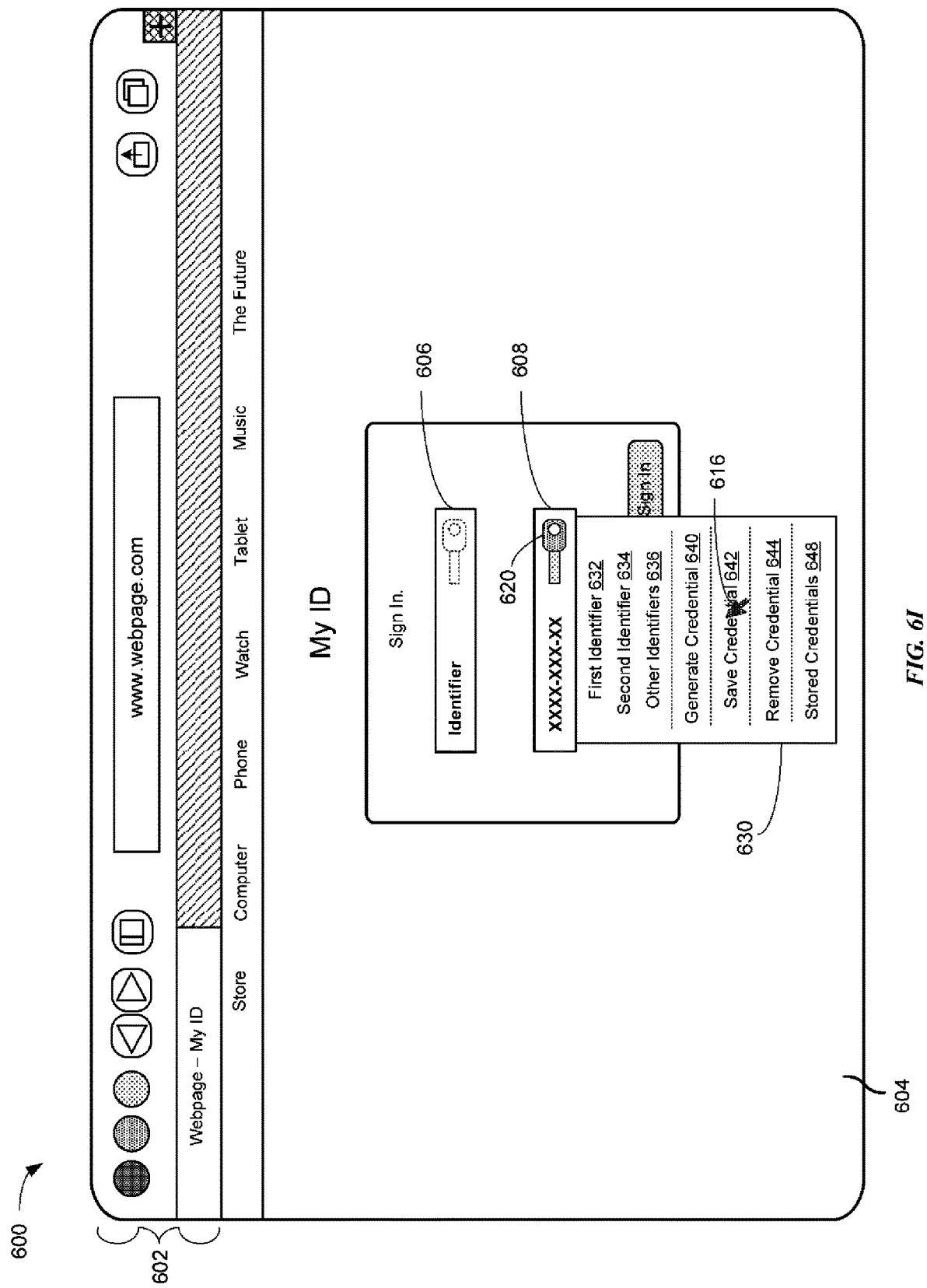
FIG. 6I illustrates an example user interface for credential entry and management in accordance with some embodiments.

Referring to FIG. 6I, electronic device configures browser interface 600 to save or otherwise store text entered into text entry field 608 as a credential and into the memory. In some embodiments, electronic device configures browser interface 600 to receive an input corresponding to selection of the save credential affordance 642. Further, electronic device configures browser interface 600 to store the entered text as a credential with or without associating the entered text with an identifier.

For example, in some embodiments, the entered text is entered in conjunction with an identifier entered in identifier field 606. As such, the entered text (e.g., credential/password) is saved in conjunction with and associated with an identifier. In some embodiments, the entered text is entered without an identifier entered in identifier field 606. Accordingly, electronic device configures browser interface 600 to store the entered text in the memory without an association to an identifier.

In some embodiments, a selection of the save credential affordance 642 associates or links a credential (e.g., password) with an identifier (e.g., username) subsequently entered in tandem with the credential on the same webpage. For example, electronic device configures browser interface 600 to determine whether text entry field (e.g., identifier field 606) associated with the text entry field 608 includes an entered identifier. Electronic device configures browser interface 600 to associate the entered text (e.g., password) with the entered identifier (e.g., username) as a stored credential for the entered identifier based on a determination that the text entry field 608 associated with the text entry field (e.g., identifier field 606) includes the entered identifier. In some embodiments, the foregoing occurs before a user submits a credential and identifier to access the resource.

In some embodiments, an appearance of the text entry field 608 (e.g., credential/password field) changes when a credential is saved to indicate that the credential is saved (e.g., change background from white to yellow). In some embodiments, a stored credential is suggested for a confirm credential field during, for example, account setup. Specifically, in an account setup stage, a webpage displays a second text field requesting to confirm an entered password in and below a first text field. As such, a stored credential is suggested in the confirm credential field.

Figure 6J:
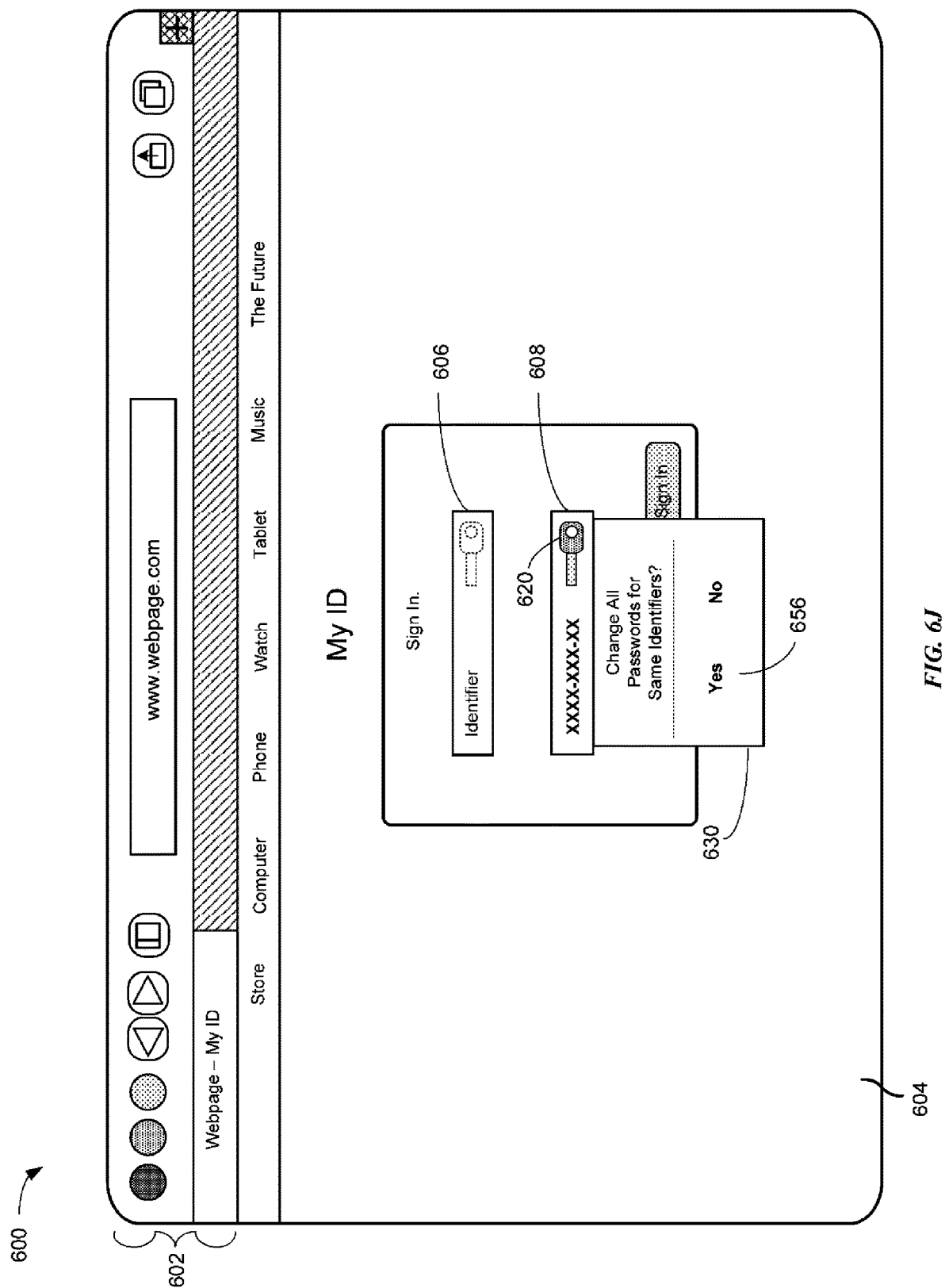
FIG. 6J illustrates an example user interface for credential entry and management in accordance with some embodiments.

Referring to FIG. 6J, in some embodiments, browser interface 600 allows the user to change the credentials (e.g., password) for all similar identifiers to the entered credential having the same identifier. Specifically, electronic device configures browser interface 600 to determine whether an identifier entered in the identifier field 606 is the same as an identifier stored in the memory and associated with a different credential than the one entered in the text entry field 608.

Browser interface 600 displays a credential update affordance 656 in credential-assistance user interface 630 in response to determining that an entered identifier is the same as a stored identifier. In some embodiments, the credential update affordance 656 requests user confirm whether to change all credentials associated with same identifier to the entered credential. Upon selecting "Yes", electronic device configures browser interface 600 to change all credentials of the stored identifiers that are the same as the entered identifier to the entered credential. As such, in some embodiments, an association of all same or similar identifiers is updated from an association to a respective current credential to the entered credential. That is, the credential for each of the same identifiers is updated to or replaced by the entered credential.

Figure 6K:
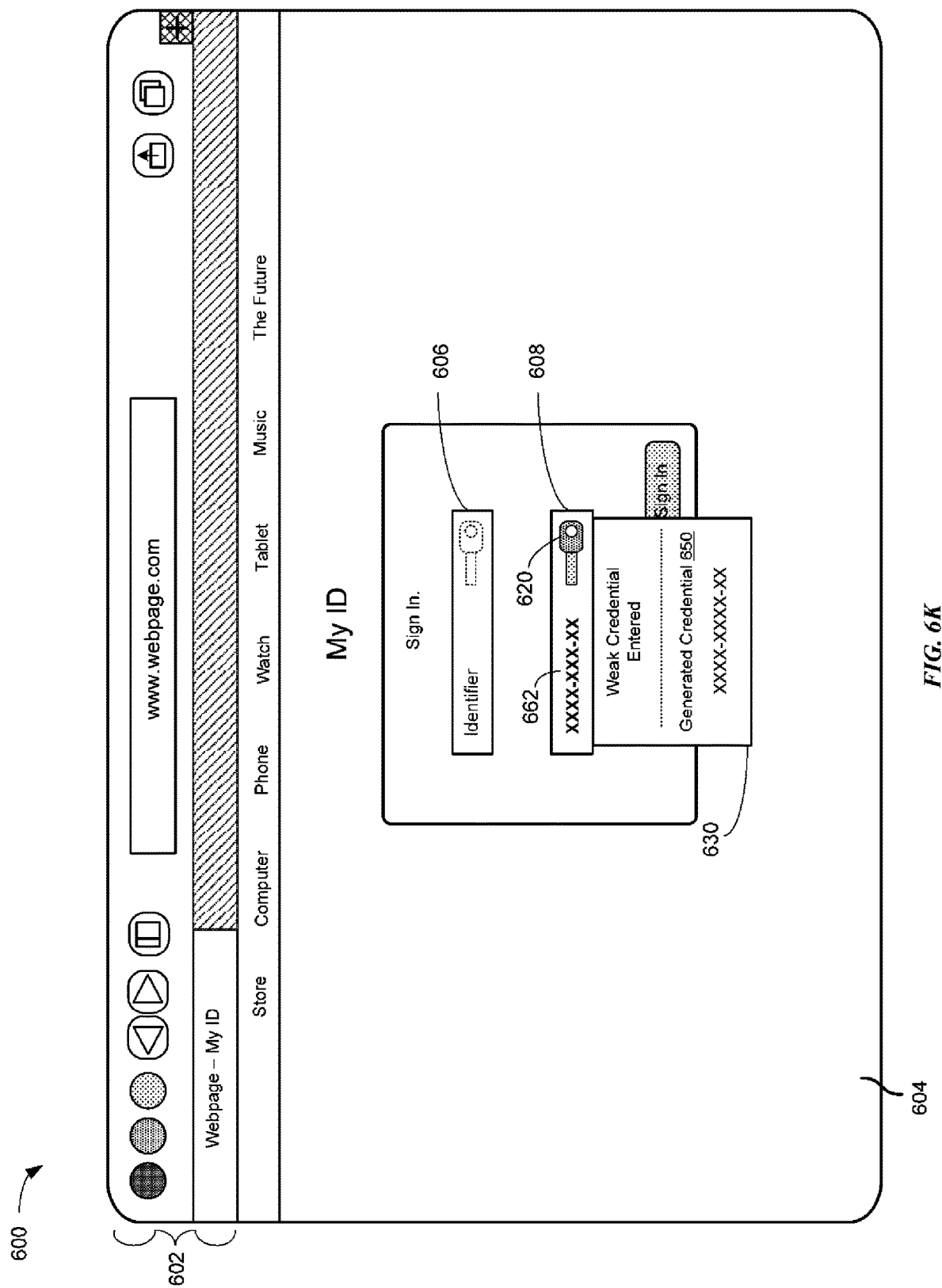
FIG. 6K illustrates an example user interface for credential entry and management in accordance with some embodiments.

Referring to FIG. 6K, electronic device configures browser interface 600 to automatically generate and display a generated credential 650 based on a determination that a weak credential has been entered. Specifically, for example, electronic device configures browser interface 600 to determine whether an entered credential 662 meets a credential strength standard. Further, electronic device configures browser interface 600 to generate and display a generated credential 650 meeting the credential strength standard in accordance with a determination that the entered credential does not meet the credential strength standard.

Figure 6L:
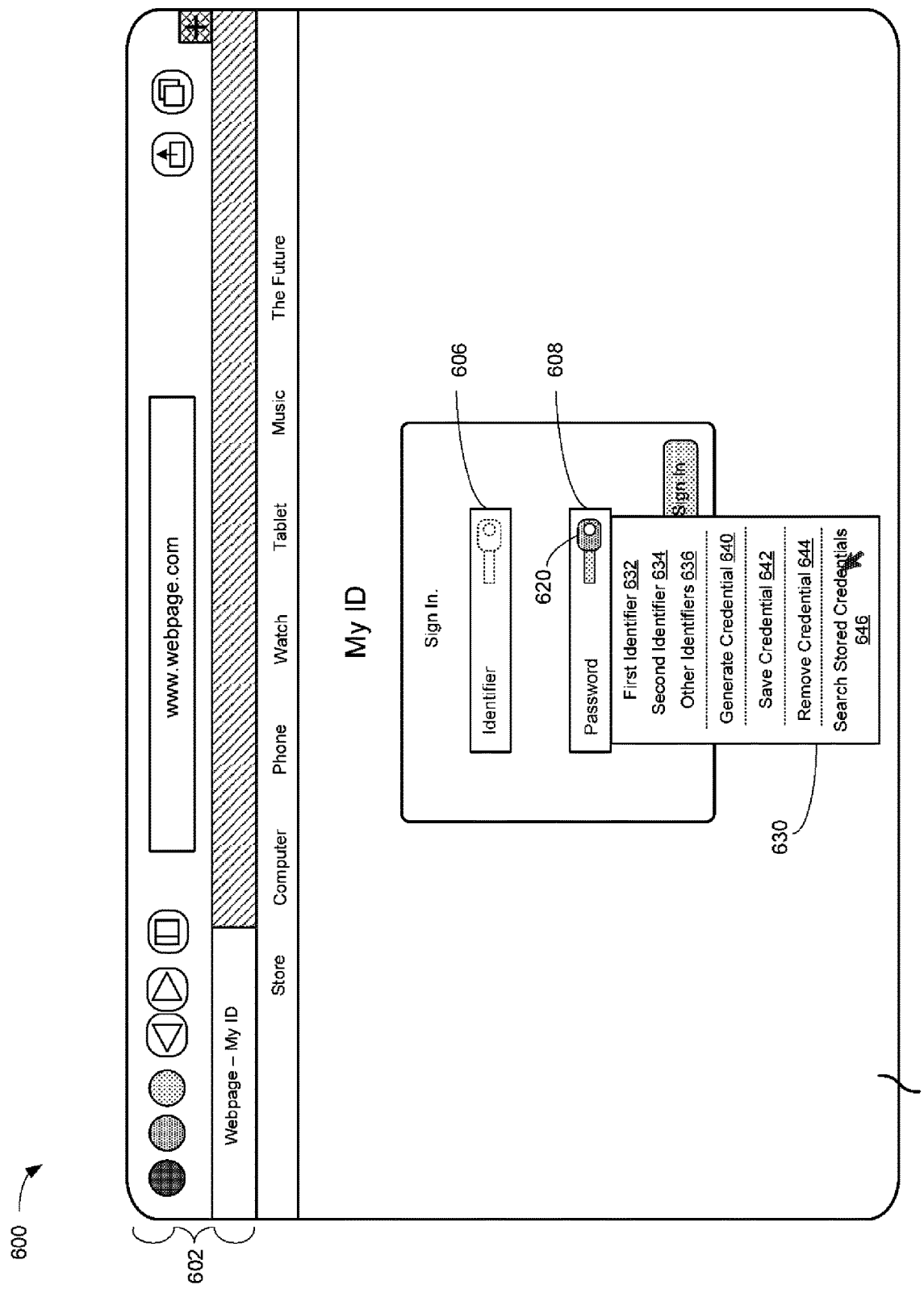
FIG. 6L illustrates an example user interface for credential entry and management in accordance with some embodiments.
Figure 6M:
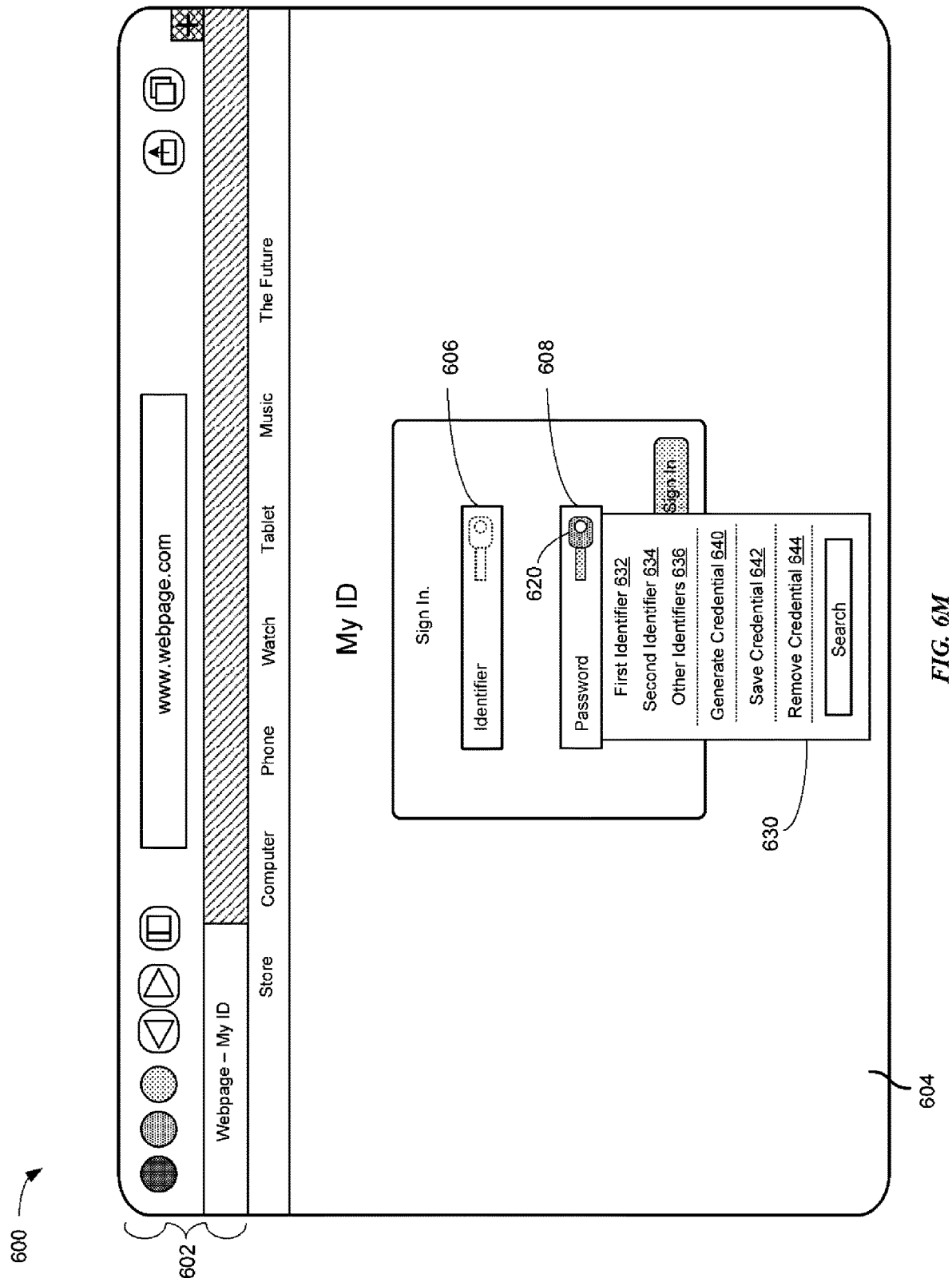
FIG. 6M illustrates an example user interface for credential entry and management in accordance with some embodiments.

Referring to FIGS. 6L and 6M, the credential-assistance user interface 630 includes a search stored credentials affordance 646 for searching through stored credentials. For example, a selection of the search stored credentials affordance 646 prompts a search field. Text is entered in the search field for use in searching through the memory for stored identifiers and/or credentials.

Figure 6N:
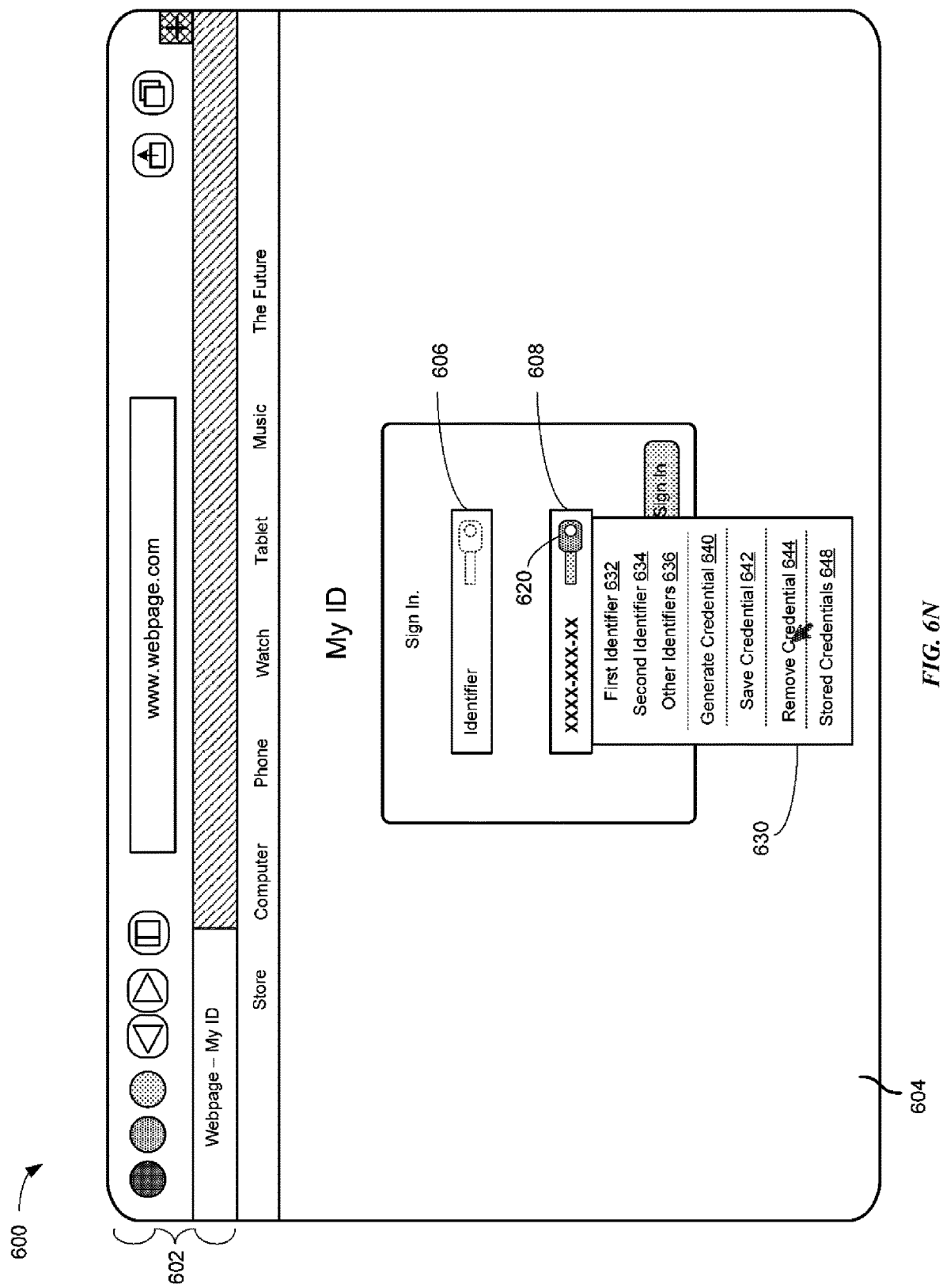
FIG. 6N illustrates an example user interface for credential entry and management in accordance with some embodiments.

Referring to FIG. 6N, credential-assistance user interface 630 provides an option to remove or delete a credential. For example, after browser interface 600 autofills text entry field 608 with a stored credential, a user desires to remove the credential from the text entry field and delete it from the memory. As such, electronic device configures browser interface 600 to remove the automatically filled credential from the text entry field 608 and removing the automatically filled credential from the memory in response to receiving the input corresponding to selection of the remove credential affordance 644.

Figure 6O:
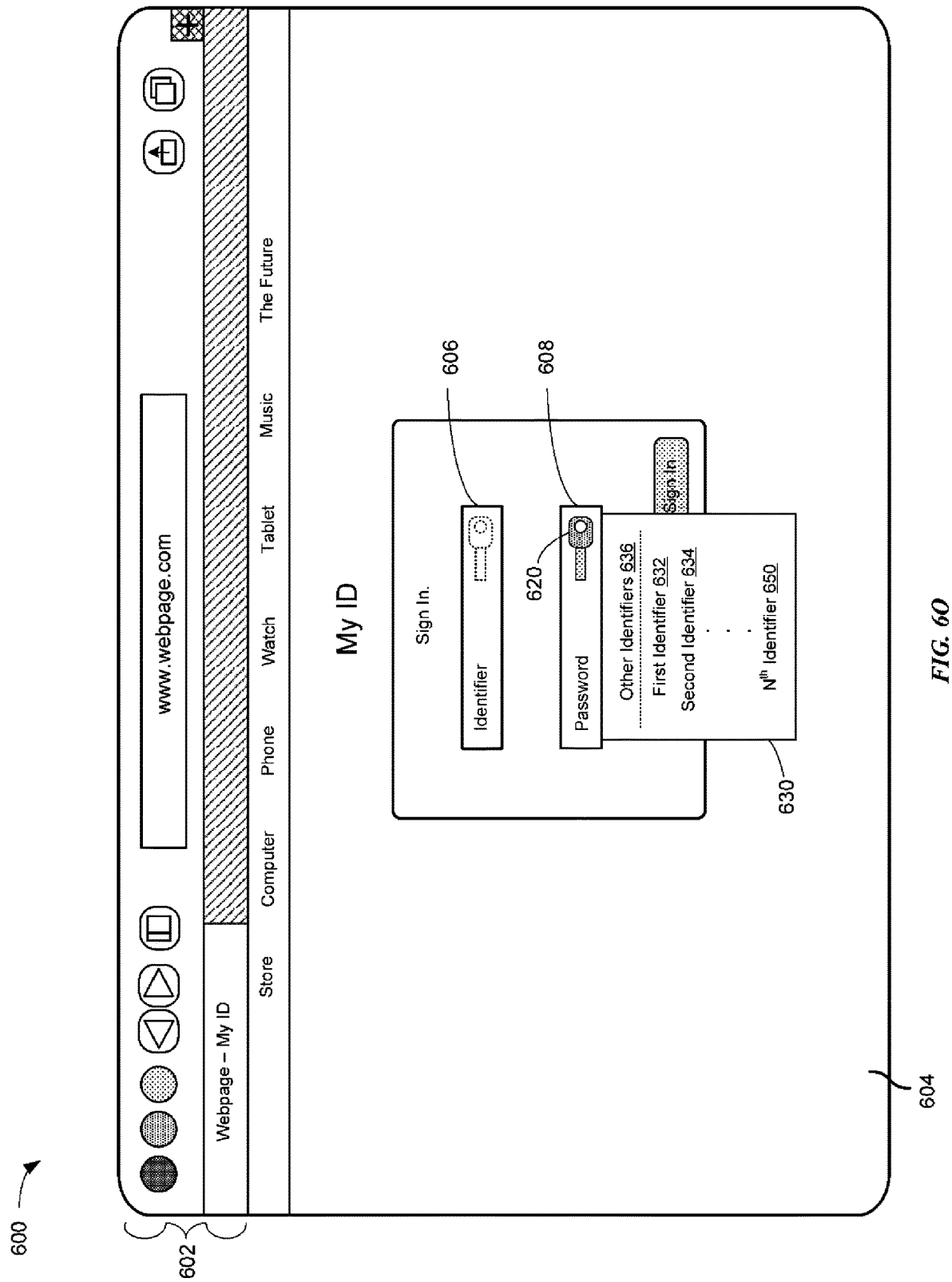
FIG. 6O illustrates an example user interface for credential entry and management in accordance with some embodiments.
Figure 6P:
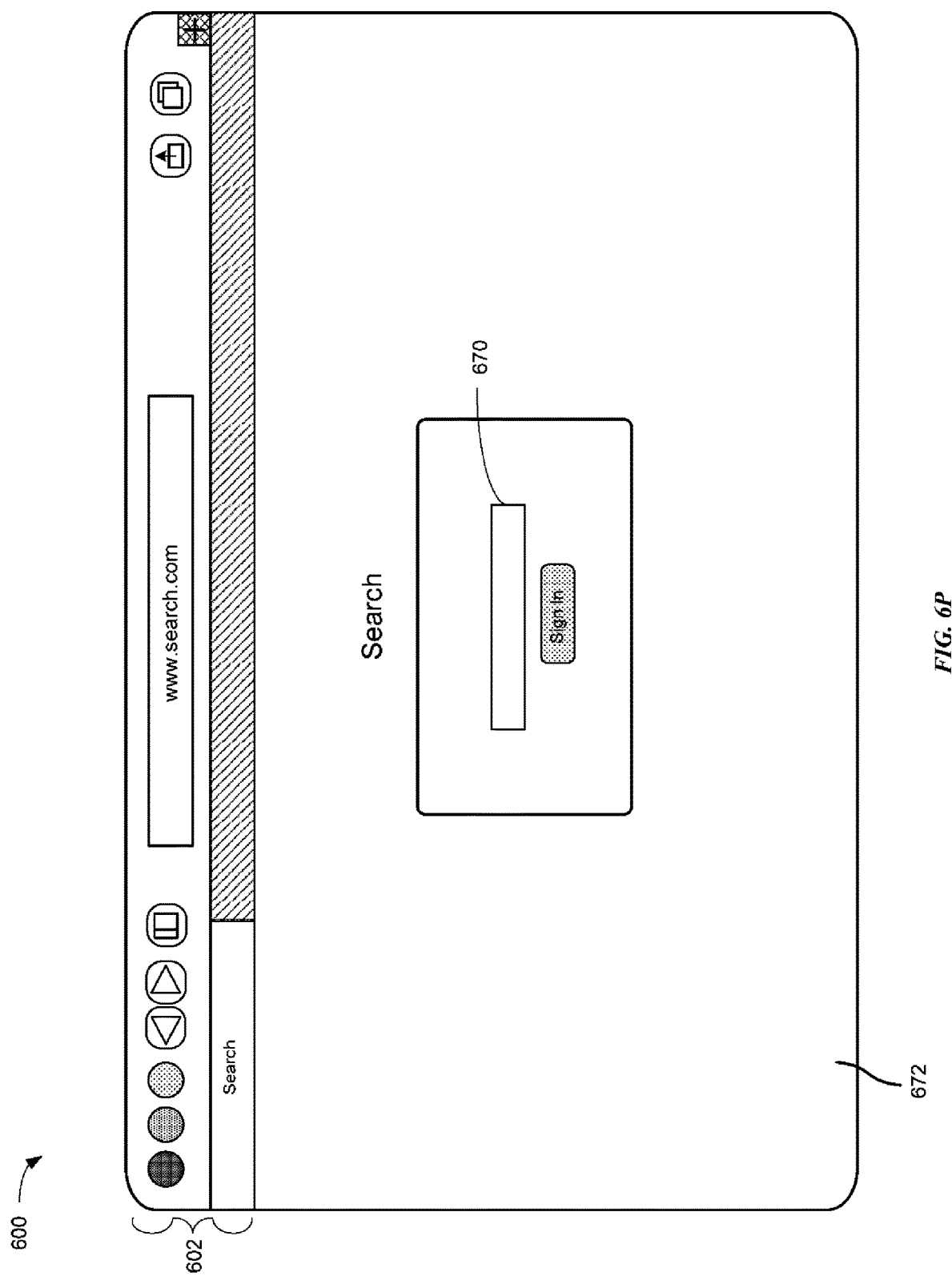
FIG. 6P illustrates an example user interface for credential entry and management in accordance with some embodiments.

Referring to FIG. 6O, in some embodiments, the electronic device configures browser interface 600 to receive a selection of the other identifiers affordance 636. In response to a selection of the other identifiers affordance 636, credential-assistance user interface 630 displays the names of identifiers (e.g., $N^{th}$ identifier 650) for credentials other than the identifiers associated with webpage 604. Specifically, electronic device configures browser interface 600 to include a display other identifiers affordance 636 in the credential-assistance user interface 630 that displays one or more identifiers associated with one or more additional sets of one or more restricted resources.

Referring to FIG. 6P, in some embodiments, the electronic device configures browser interface 600 to display a document (e.g., webpage 672) without displaying credential affordance 620 (FIG. 6B) and without filling in the text entry field 670 based on a determination that the text entry field (e.g., text entry field 670, FIG. 6P) is not a credential entry field (e.g., password field).

FIGS. 7A and 7B are flow diagrams illustrating a method of credential entry and management using an electronic device and in accordance with some embodiments. Methods 700 and/or 720 can optionally be performed at a device (e.g., portable multifunction devices 100, 300, and/or 500) with a display and a memory (102, 370, and 518). Some operations in methods 700 and/or 720 can optionally be combined, the order of some operations can optionally be changed or altered, and some operations can optionally be omitted.

As described below, methods 700 and 720 provide an intuitive way for readily entering and managing credentials, for example, in a browser interface of a browser application. The method reduces the cognitive and/or physical burden on a user during such entry and/or management, thereby creating a more efficient human-machine interface. For battery-operated computing devices, enabling a user to enter and manage credentials more efficiently conserves power and increases the time between battery charges.

Referring to FIG. 7A, at block 702, method 700 displays, on the display (e.g., display 112, FIG. 1), a text entry field (e.g., text entry field 608, FIG. 6) associated with a set of one or more restricted resources (e.g., first webpage 604) and a credential affordance (e.g., credential affordance 620, FIG. 6B) associated with the text entry field. At block 704, method 700 receives a first input corresponding to selection of the credential affordance.

At blocks 706-710, method 700 can optionally, in response to receiving the first input (e.g., first input 610, FIG. 6C), display a credential-assistance user interface (credential-assistance user interface 630, FIG. 6C). Specifically, at block 706, method 700 can optionally, in response to receiving the first input, determine whether a credential is stored in the memory (e.g., memory 102, FIG. 1). At block 708, method 700 can optionally, in accordance with a determination that the credential is not stored in the memory, forgo display of the identifier (e.g., first identifier 632, FIG. 6C) in the credential-assistance user interface.

However, at block 710, method 700 can optionally, in accordance with a determination that a credential is stored in the memory, display an identifier (e.g., first identifier 632, FIG. 6D) associated with the credential (e.g., credential 628, FIG. 6D) in the credential-assistance user interface. At block 712, method 700 receives an input corresponding to selection of the identifier. At block 714, method 700 can optionally, in response to receiving the input (e.g., input 638, FIG. 6D) corresponding to selection of the identifier, retrieve the credential stored in the memory and enter the credential into the text entry field.

In some embodiments, entering the credential into the text entry field includes displaying a concealed representation of the credential in the text entry field.

In some embodiments, the method further includes in response to receiving the first input corresponding to selection of the credential affordance and in accordance with the determination that a second credential associated with a second set of one or more restricted resources and a second identifier is stored in the memory, displaying an access stored identifiers affordance (e.g., other identifiers affordance 636 or stored credentials affordance 648, FIG. 6C); receiving an input corresponding to selection of the access stored identifiers affordance; and in response to receiving the input corresponding to selection of the access stored identifiers affordance, displaying, in the credential-assistance user interface, a plurality of stored identifiers including the identifier and the second identifier.

In some embodiments, the credential-assistance user interface is displayed in a user interface region that is separate from the user interface region that includes the text entry field.

In some embodiments, the credential-assistance user interface 630 (FIG. 6C) is displayed in a first position (e.g., displayed below the text entry field 608 in FIG. 6C), the method further includes while displaying the credential-assistance user interface 630 (FIG. 6C) in the first position, receiving an input corresponding to a request to display the credential-assistance user interface in a second position (e.g., displayed partially outside the browser interface 600 in FIG. 6E); and in response to receiving the input corresponding to the request to display the credential-assistance user interface 630 (FIG. 6E) in the second position, displaying the credential-assistance user interface in the second position, wherein the second position is distinct from the first position and separate from the user interface region that includes the text entry field (e.g., text entry field 608 of FIG. 6C, or text entry field 614 of FIG. 6E).

In some embodiments, the method further includes while displaying the credential-assistance user interface (e.g., credential-assistance user interface 630, FIG. 6E) in the second position, receiving an input corresponding to a request to display a second text entry field (e.g., second text entry field 614 on a different webpage, FIG. 6E); in response to receiving the input corresponding to a request to display a second text entry field: displaying the second text entry field, wherein the second text entry field is distinct from the text entry field and wherein the second text entry field is associated with a third set of one or more restricted resources; and replacing, in the credential-assistance user interface, display of the identifier associated with the credential with display of a distinct identifier (e.g., third identifier 646—"Jane Smith") associated with a distinct credential, wherein the distinct credential is associated with the third set of one or more restricted resources.

In some embodiments, the method further includes in response to receiving the first input (e.g., first input 610, FIG. 6C) corresponding to selection of the credential affordance (e.g., credential affordance 620, FIG. 6C), determining whether text has been entered in the text entry field; in accordance with a determination that text has not been entered in the text entry field, displaying a generate-credential affordance (e.g., generate-credential affordance 640); receiving an input corresponding to selection of the generate-credential affordance; and in response to receiving the input corresponding to selection of the generate-credential affordance, generating and displaying a generated credential (e.g., generated credential 650).

In some embodiments, the method further includes, in accordance with a determination that text has been entered in the text entry field, displaying a plurality of password options without displaying an active option for generating a new credential.

In some embodiments, the method further includes, receiving an input corresponding to selection of the generated credential; and in response to receiving the input corresponding to selection of the generated credential, associating the generated credential with a third identifier and storing the generated credential in the memory.

In some embodiments, the method further includes, in response to receiving the first input corresponding to selection of the credential affordance and in accordance with a determination that the text entry field includes entered text, displaying a save credential affordance (e.g., save credential affordance 642, FIG. 6C).

In some embodiments, the method further includes, receiving an input (e.g., input 616, FIG. 6I) corresponding to selection of the save credential affordance; and in response to receiving the input corresponding to selection of the save credential affordance, storing the entered text as a credential without associating the entered text with a fourth identifier.

In some embodiments, the method further includes receiving an input (e.g., input 616, FIG. 6I) corresponding to selection of the save credential affordance (e.g., save credential affordance 642, FIG. 6I); and in response to receiving the input corresponding to selection of the save credential affordance, associating the entered text (e.g., credential/password entered in text entry field 608, FIG. 6I) with a fourth identifier (e.g., entered in identifier field 606, FIG. 6I) and storing the entered text as a credential for the fourth identifier.

In some embodiments, the method further includes receiving an input (e.g., input 616, FIG. 6I) corresponding to selection of the save credential affordance (e.g., save credential affordance 642, FIG. 6I); in response to receiving the input corresponding to selection of the save credential affordance, determining whether a third text entry field (e.g., identifier field 606, FIG. 6I) associated with the text entry field 608 (FIG. 6I) includes an entered identifier (e.g., username); and in accordance with a determination that the third text entry field associated with the text entry field includes the entered identifier, associating the entered text with the entered identifier as a stored credential for the entered identifier.

In some embodiments, the method further includes receiving an input (e.g., input 616, FIG. 6I) corresponding to selection of the save credential affordance (e.g., save credential affordance 642, FIG. 6I); in response to receiving the input corresponding to selection of the save credential affordance, determining whether a fourth identifier (e.g., first username) entered in a third text entry field (e.g., identifier field 606, FIG. 6I) associated with the text entry field is the same as a fifth identifier (e.g. second username) stored in the memory associated with a third credential (e.g., credential/password), wherein a third credential is distinct from an entered credential; in accordance with a determination that the fourth identifier entered in a third text entry field associated with the text entry field is the same as the fifth identifier stored in the memory, displaying a credential update affordance (e.g., credential update affordance 656, FIG. 6J); in accordance with a determination that the fourth identifier entered in a third text entry field associated with the text entry field is not the same as the fifth identifier stored in the memory, forgoing display of the credential update affordance and storing the fourth identifier and the entered credential in the memory; and while displaying the credential update affordance: receiving an input corresponding to selection of the credential update affordance (e.g., selecting "Yes" affordance, FIG. 6J); and in response to receiving the input corresponding to selection of the credential update affordance, updating the association of the fifth identifier from the third credential to the entered credential.

In some embodiments, the method further includes receiving an input (e.g., input 616, FIG. 6I) corresponding to selection of the save credential affordance (e.g., save credential affordance 642, FIG. 6I); in response to receiving the input corresponding to selection of the save credential affordance, determining whether an entered credential (e.g., credential 662 entered in text entry field 608, FIG. 6K) meets a credential strength standard, wherein the credential strength standard includes one or more rules associated with formation of credentials; in accordance with a determination that the entered credential does not meet the credential strength standard, generating and displaying a generated credential (e.g., generated credential 650, FIG. 6K) meeting the credential strength standard; and in accordance a determination that the entered credential meets the credential strength standard, associating the entered credential with a fourth identifier (e.g., identifier entered in identifier field 606, FIG. 6K) and storing the entered credential in the memory.

In some embodiments, the method further includes receiving an input (e.g., input 616, FIG. 6I) corresponding to selection of the save credential affordance (e.g., save credential affordance 642, FIG. 6I); in response to receiving the input corresponding to selection of the save credential affordance, adjusting the text entry field (e.g., text entry field 608, FIG. 6I) from a first appearance (e.g., first color) to a second appearance (e.g., second color) different from the first appearance.

In some embodiments, the method further includes displaying a fourth text entry field (e.g., text entry field 608, FIG. 6I) associated with the first text entry field; in response to receiving the input corresponding to selection of the second identifier (e.g., first identifier 632, FIG. 6I), displaying a saved credential (e.g., credential/password in concealed form, FIG. 6I) in the fourth text entry field.

In some embodiments, the method further includes, the credential-assistance user interface (e.g., credential-assistance user interface 630, FIG. 6C) includes a display additional identifier affordance (e.g., other identifiers affordance 636 or stored credentials affordance 648, FIG. 6C) that displays one or more identifiers (e.g., usernames) associated with one or more additional sets of one or more restricted resources (e.g., webpages), wherein the one or more additional sets of one or more restricted resources are distinct from the set of one or more restricted resources.

In some embodiments, the method further includes the credential-assistance user interface includes a search entry field (e.g., search field, FIG. 6M) for searching one or more stored credentials.

In some embodiments in which displaying the text entry field includes displaying the text entry field having an automatically filled credential stored in the memory, and wherein the credential-assistance user interface includes a remove credential affordance, the method further includes receiving an input corresponding to selection of the remove credential affordance (e.g., remove credential affordance 644, FIG. 6N); and in response to receiving the input corresponding to selection of the remove credential affordance, removing the automatically filled credential from the text entry field and removing the automatically filled credential from the memory.

In some embodiments in which displaying the credential affordance associated with the text entry field includes displaying the credential affordance within or adjacent to the text entry field.

In some embodiments, the text entry field is one of a username field or a password field.

In some embodiments, the set of one or more restricted resources is a webpage, and wherein the identifier is a domain of the webpage.

In some embodiments, the identifier is a username.

In some embodiments, the credential is a password.

Referring to FIG. 7B, at block 702, method 720 receives a request to display a document (e.g., webpage 604, FIG. 6A) that includes a text entry field (e.g., text entry field 608 (FIG. 6A). At block 724 to 728, method 720 can optionally, in response to receiving the request, display the document with the text entry field. Specifically, at block 724, method 720 can optionally, in response to receiving the request, determine whether the text entry field corresponds to a credential entry field for which a stored password is available.

At block 726, method 720 can optionally, in accordance with a determination that the text entry field corresponds to a credential entry field for which a stored credential is available, filling in the text entry field with the stored credential; and in accordance with a determination that the text entry field corresponds to a credential entry field for which a stored credential is not available, displaying, on the display, a credential affordance (e.g., credential affordance 620, FIG. 6B) associated with the text entry field without filling in the text entry field.

In some embodiments, the method further includes, in accordance with a determination that the text entry field (e.g., text entry field 670, FIG. 6P) is not a credential entry field (e.g., password field), displaying the document (e.g., webpage) without displaying the credential affordance (e.g., credential affordance 620, FIG. 6B) and without filling in the text entry field.

In some embodiments, determining whether text entry field is a credential entry field is based on markup language associated with the text entry field.

In some embodiments, the method further includes receiving a second input corresponding to selection of the credential affordance; in response to receiving the second input, displaying a credential-assistance user interface (e.g., credential-assistance user interface 630, FIG. 6C), wherein the credential-assistance includes one or more of: an identifier associated with a stored credential; and an option to generate a new password.

Figure 8:
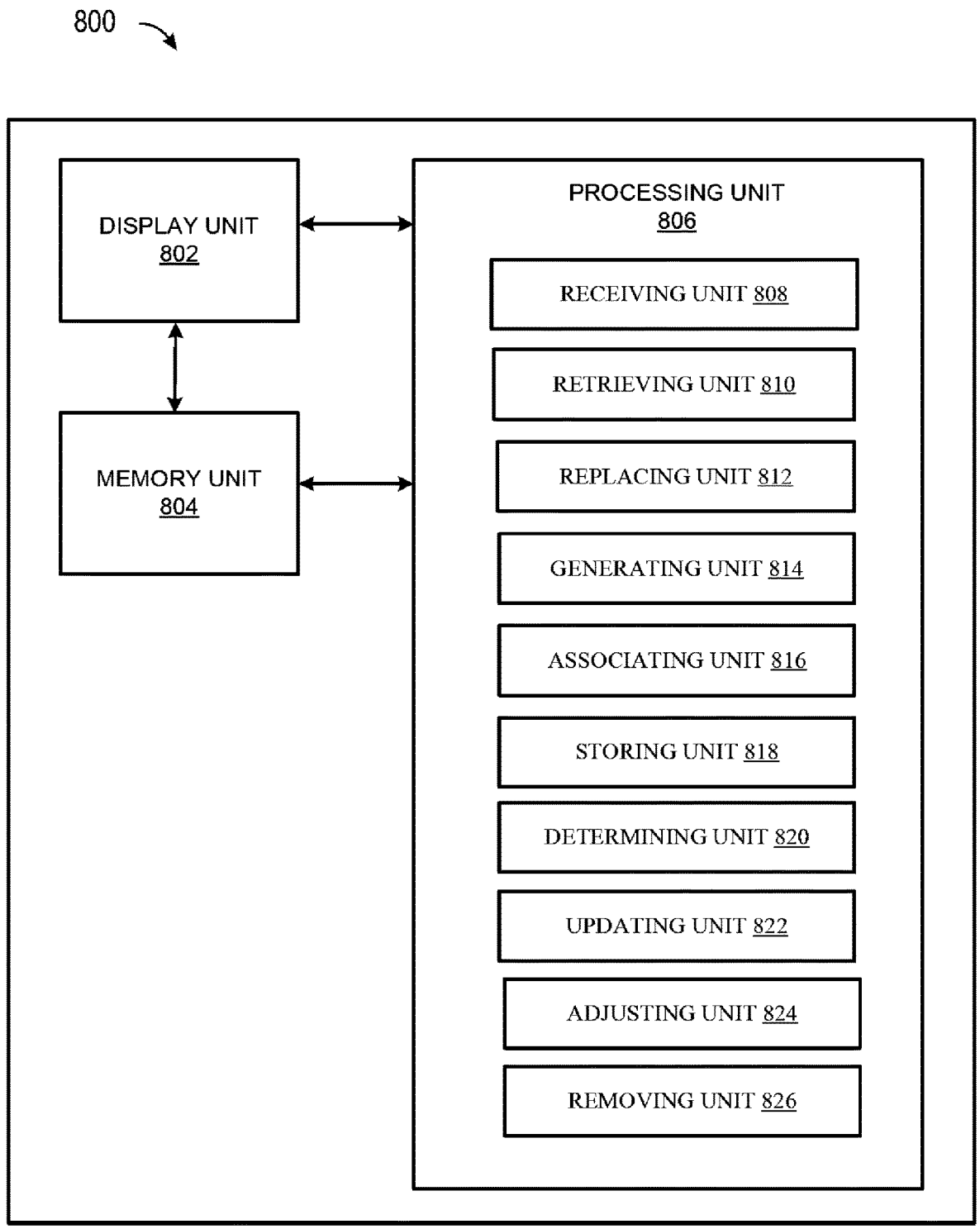
FIG. 8 is a functional block diagram in accordance with some embodiments.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a display unit 802, a memory unit 804, and a processing unit 806 coupled to the display unit 802 and the memory unit 804. In some embodiments, the processing unit 806 includes a receiving unit 808, retrieving unit 808, replacing unit 812, generating unit 814, associating unit 816, storing unit 818, determining unit 820, updating unit 822, adjusting unit 824, and removing unit 826.

The processing unit 806 is configured to: display (e.g., using display unit 802), a text entry field associated with a set of one or more restricted resources and a credential affordance associated with the text entry field; receive (e.g., using receiving unit 808) a first input corresponding to selection of the credential affordance; in response to receiving the first input, display (e.g., using display unit 802) a credential-assistance user interface, wherein to display the credential-assistance user interface, the processing unit 806 is configured to: in accordance with a determination that a credential is stored in the memory, display (e.g., using display unit 802) an identifier associated with the credential in the credential-assistance user interface; and receive an input corresponding to selection of the identifier; and in response to receiving the input corresponding to selection of the identifier, retrieve (e.g., using retrieving unit 810) the credential stored in the memory unit 804 and entering the credential into the text entry field.

In some embodiments, the processing unit 806 is further configured to, in accordance with a determination that the credential is not stored in the memory unit 804, forgo display of the identifier in the credential-assistance user interface.

In some embodiments, to enter the credential into the text entry field, the processing unit is further configured to display (e.g., using display unit 802) a concealed representation of the credential in the text entry field.

In some embodiments, the processing unit 806 is further configured to: in response to receiving the first input corresponding to selection of the credential affordance and in accordance with the determination that a second credential associated with a second set of one or more restricted resources and a second identifier is stored in the memory, display (e.g., using display unit 802) an access stored identifiers affordance; receive (e.g., using receiving unit 808) an input corresponding to selection of the access stored identifiers affordance; and in response to receiving the input corresponding to selection of the access stored identifiers affordance, display (e.g., using display unit 802), in the credential-assistance user interface, a plurality of stored identifiers including the identifier and the second identifier.

In some embodiments, the credential-assistance user interface is displayed in a user interface region that is separate from the user interface region that includes the text entry field.

In some embodiments, the credential-assistance user interface is displayed in a first position, wherein the processing unit 806 is further configured to: while displaying the credential-assistance user interface in the first position, receive (e.g., using receiving unit 808) an input corresponding to a request to display the credential-assistance user interface in a second position; and in response to receiving the input corresponding to the request to display the credential-assistance user interface in the second position, display (e.g., using display unit 802) the credential-assistance user interface in the second position, wherein the second position is distinct from the first position and separate from the user interface region that includes the text entry field.

In some embodiments, the processing unit 806 is further configured to: while displaying the credential-assistance user interface in the second position, receive (e.g., using receiving unit 808) an input corresponding to a request to display a second text entry field; in response to receiving the input corresponding to a request to display a second text entry field: display (e.g., using display unit 802) the second text entry field, wherein the second text entry field is distinct from the second text entry field and wherein the text entry field is associated with a third set of one or more restricted resources; and replace (e.g., using replacing unit 812), in the credential-assistance user interface, display of the identifier associated with the credential with display of a distinct identifier associated with a distinct credential, wherein the distinct credential is associated with the third set of one or more restricted resources.

In some embodiments, the processing unit 806 is further configured to: in response to receiving the first input corresponding to selection of the credential affordance, determine (e.g., using determining unit 820) whether text has been entered in the text entry field; in accordance with a determination that text has not been entered in the text entry field, display (e.g., using display unit 802) a generate-credential affordance; receive (e.g., receiving unit 808) an input corresponding to selection of the generate-credential affordance; and in response to receiving the input corresponding to selection of the generate-credential affordance, generate (e.g., using generating unit 814) and display (e.g., using display unit 802) a generated credential.

In some embodiments, the processing unit 806 is further configured to, in accordance with a determination that text has been entered in the text entry field, display (e.g., using display unit 802) a plurality of password options without displaying an active option for generating a new credential.

In some embodiments, the processing unit 806 is further configured to: receive (e.g., using receiving unit 808) an input corresponding to selection of the generated credential; and in response to receiving the input corresponding to selection of the generated credential, associate (e.g., using associating unit 816) the generated credential with a third identifier and storing the generated credential in the memory.

In some embodiments, the processing unit 806 is further configured to: in response to receiving the first input corresponding to selection of the credential affordance and in accordance with a determination that the text entry field includes entered text, display (e.g., using display unit 802) a save credential affordance.

In some embodiments, the processing unit 806 is further configured to: receive (e.g., using receiving unit 808) an input corresponding to selection of the save credential affordance; and in response to receiving the input corresponding to selection of the save credential affordance, store (e.g., using storing unit 818) the entered text as a credential without associating the entered text with a fourth identifier.

In some embodiments, the processing unit 806 is further configured to: receive (e.g., using receiving unit 808) an input corresponding to selection of the save credential affordance; and in response to receiving the input corresponding to selection of the save credential affordance, associate (e.g., using associating unit 816) the entered text with a fourth identifier and storing the entered text as a credential for the fourth identifier.

In some embodiments, the processing unit 806 is further configured to: receive (e.g., using receiving unit 808) an input corresponding to selection of the save credential affordance; in response to receiving the input corresponding to selection of the save credential affordance, determine (e.g., using determining unit 820) whether a third text entry field associated with the text entry field includes an entered identifier; and in accordance with a determination that the third text entry field associated with the text entry field includes the entered identifier, associate (e.g., using associating unit 816) the entered text with the entered identifier as a stored credential for the entered identifier.

In some embodiments, the processing unit 806 is further configured to: receive (e.g., using receiving unit 808) an input corresponding to selection of the save credential affordance; in response to receiving the input corresponding to selection of the save credential affordance, determine (e.g., using determining unit 820) whether a fourth identifier entered in a third text entry field associated with the text entry field is the same as a fifth identifier stored in the memory associated with a third credential, wherein a third credential is distinct from an entered credential; in accordance with a determination that the fourth identifier entered in a third text entry field associated with the text entry field is the same as the fifth identifier stored in the memory, display (e.g., using display unit 802) a credential update affordance; in accordance with a determination that the fourth identifier entered in a third text entry field associated with the text entry field is not the same as the fifth identifier stored in the memory, forgo display of the credential update affordance and storing the fourth identifier and the entered credential in the memory; and while displaying the credential update affordance: receive (e.g., using receiving unit 808) an input corresponding to selection of the credential update affordance; and in response to receiving the input corresponding to selection of the credential update affordance, update (e.g., using updating unit 822) the association of the fifth identifier from the third credential to the entered credential.

In some embodiments, the processing unit 806 is further configured to: receive (e.g., using receiving unit 808) an input corresponding to selection of the save credential affordance; in response to receiving the input corresponding to selection of the save credential affordance, determine (e.g., using determining unit 820) whether an entered credential meets a credential strength standard, wherein the credential strength standard includes one or more rules associated with formation of credentials; in accordance with a determination that the entered credential does not meet the credential strength standard, generate (e.g., using generating unit 814) and display (e.g., using display unit 802) a generated credential meeting the credential strength standard; and in accordance a determination that the entered credential meets the credential strength standard, associate (e.g., using associating unit 824) the entered credential with a fourth identifier and storing the entered credential in the memory.

In some embodiments, the processing unit 806 is further configured to: receive (e.g., using receiving unit 808) an input corresponding to selection of the save credential affordance; in response to receiving the input corresponding to selection of the save credential affordance, adjust (e.g., using adjusting unit 824) the text entry field from a first appearance to a second appearance different from the first appearance.

In some embodiments, the processing unit 806 is further configured to: display (e.g., using display unit 802) a fourth text entry field associated with the first text entry field; in response to receiving the input corresponding to selection of the second identifier, display (e.g., using display unit 802) a saved credential in the fourth text entry field.

In some embodiments, the credential-assistance user interface includes a display additional identifier affordance that displays one or more identifiers associated with one or more additional sets of one or more restricted resources, wherein the one or more additional sets of one or more restricted resources are distinct from the set of one or more restricted resources.

In some embodiments, the credential-assistance user interface includes a search entry field for searching one or more stored credentials.

In some embodiments, to display the text entry field, the processing unit 806 is further configured to display (e.g., using display unit 802) the text entry field having an automatically filled credential stored in the memory, and wherein the credential-assistance user interface includes a remove credential affordance, the processing unit 806 is further configured to: receive (e.g., using receiving unit 808) an input corresponding to selection of the remove credential affordance; and in response to receiving the input corresponding to selection of the remove credential affordance, remove (e.g., using removing unit 826) the automatically filled credential from the text entry field and removing the automatically filled credential from the memory.

In some embodiments, to display the credential affordance associated with the text entry field, the processing unit 806 is further configured to display the credential affordance within or adjacent to the text entry field.

In some embodiments, the text entry field is one of a username field or a password field.

In some embodiments, the set of one or more restricted resources is a webpage, and wherein the identifier is a domain of the webpage.

In some embodiments, the identifier is a username.

In some embodiments, the credential is a password.

The operations described above with reference to FIG. 7A are, optionally, implemented by components depicted in FIGS. 1A-1B or FIG. 8. For example, displaying operation 702, receiving operation 704, determining operation 706, forgoing operation 708, displaying operation 710, receiving operation 712, retrieving operation 714, can optionally be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 can optionally utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 9:
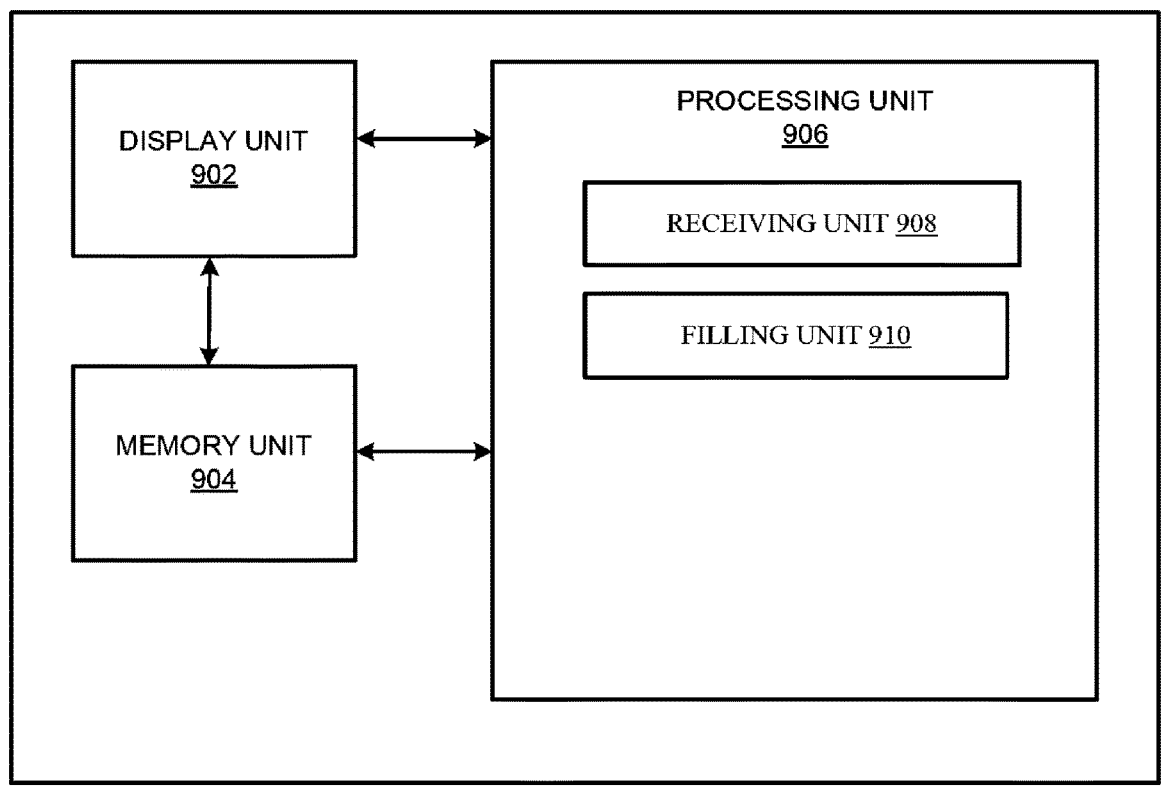
FIG. 9 is a functional block diagram in accordance with some embodiments.

In accordance with some embodiments, FIG. 9 shows an exemplary functional block diagram of an electronic device 900 configured in accordance with the principles of the various described embodiments. In accordance with some embodiments, the functional blocks of electronic device 900 are configured to perform the techniques described above. The functional blocks of the device 900 are, optionally, implemented by hardware, software, or a combination of hardware and software to carry out the principles of the various described examples. It is understood by persons of skill in the art that the functional blocks described in FIG. 9 are, optionally, combined or separated into sub-blocks to implement the principles of the various described examples. Therefore, the description herein optionally supports any possible combination or separation or further definition of the functional blocks described herein.

As shown in FIG. 9, an electronic device 900 includes a display unit 902, an audio output unit 904, and a processing unit 906 coupled to the display unit 902 and the memory unit 904. In some embodiments, the processing unit 906 includes a receiving unit 808 and a filling unit 810.

The processing unit 906 is configured to: receive (e.g., using receiving unit 808) a request to display, on the display unit 902, a document that includes a text entry field; in response to receiving the request, display, on the display unit 902, the document with the text entry field, wherein to display the document with the text entry field, the processing unit is configured to: in accordance with a determination that the text entry field corresponds to a credential entry field for which a stored credential is available, fill (e.g., using filling unit 910) in the text entry field with the stored credential; and in accordance with a determination that the text entry field corresponds to a credential entry field for which a stored credential is not available, display, on the display unit 902, a credential affordance associated with the text entry field without filling in the text entry field.

In some embodiments, the processing unit 906 is configured to, in accordance with a determination that the text entry field is not a credential entry field, displaying (e.g., using display unit 902) the document without displaying credential affordance and without filling in the text entry field.

In some embodiments, determining whether text entry field is a credential entry field is based on markup language associated with the text entry field.

In some embodiments, the processing unit 906 is configured to: receive (e.g., using receiving unit 908) a second input corresponding to selection of the credential affordance; in response to receiving the second input, display a credential-assistance user interface, wherein the credential-assistance includes one or more of: an identifier associated with a stored credential; and an option to generate a new password.

The operations described above with reference to FIG. 7B are, optionally, implemented by components depicted in FIGS. 1A-1B or FIG. 9. For example, displaying operation 722, determining operation 724, filling operation 726, and displaying operation 728, can optionally be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 can optionally utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
   one or more processors;
   memory; and
   one or more programs stored in memory, the one or more programs including instructions for:
   detecting a set of one or more inputs that includes a request to display a restricted resource that includes an entry field; and in response to detecting the set of one or more inputs that includes the request to display the restricted resource, displaying the restricted resource with the entry field, wherein displaying the restricted resource with the entry field includes:
in accordance with a determination that the entry field corresponds to a credential entry field for which a stored credential is available, displaying a credential-assistance user interface; and
in accordance with a determination that the entry field corresponds to a credential entry field for which a stored credential is not available, forgoing to display the credential-assistance user interface.

2. The electronic device of claim 1, the one or more programs further including instructions for:
in accordance with a determination that the entry field is not a credential entry field, displaying the restricted resource without displaying the credential-assistance user interface.

3. The electronic device of claim 1, wherein determining whether the entry field is a credential entry field is based on markup language associated with the entry field.

4. The electronic device of claim 1, the one or more programs further including instructions for:
receiving a second input corresponding to selection of a credential affordance; and
in response to receiving the second input, displaying a credential-assistance user interface, wherein the credential-assistance user interface includes one or more of an identifier associated with a stored credential and an option to generate a new password.

5. A method, comprising:
at an electronic device including a memory:
detecting a set of one or more inputs that includes a request to display a restricted resource that includes an entry field; and
in response to detecting the set of one or more inputs that includes the request to display the restricted resource, displaying the restricted resource with the entry field, wherein displaying the restricted resource with the entry field includes:
in accordance with a determination that the entry field corresponds to a credential entry field for which a stored credential is available, displaying a credential-assistance user interface; and
in accordance with a determination that the entry field corresponds to a credential entry field for which a stored credential is not available, forgoing to display the credential-assistance user interface.

6. The method of claim 5, further comprising:
in accordance with a determination that the entry field is not a credential entry field, displaying the restricted resource without displaying the credential-assistance user interface.

7. The method of claim 5, wherein determining whether the entry field is a credential entry field is based on markup language associated with the entry field.

8. The method of claim 5, further comprising:
receiving a second input corresponding to selection of a credential affordance; and
in response to receiving the second input, displaying a credential-assistance user interface, wherein the credential-assistance user interface includes one or more of an identifier associated with a stored credential and an option to generate a new password.

9. A non-transitory computer-readable storage medium comprising one or more programs for execution by one or more processors of an electronic device, the one or more programs including instructions which, when executed by the one or more processors, cause the electronic device to:
detecting a set of one or more inputs that includes a request to display a restricted resource that includes an entry field; and
in response to detecting the set of one or more inputs that includes the request to display the restricted resource, displaying the restricted resource with the entry field, wherein displaying the restricted resource with the entry field includes:
in accordance with a determination that the entry field corresponds to a credential entry field for which a stored credential is available, displaying a credential-assistance user interface; and
in accordance with a determination that the entry field corresponds to a credential entry field for which a stored credential is not available, forgoing to display the credential-assistance user interface.

10. The non-transitory computer-readable storage medium of claim 9, the one or more programs further including instructions for:
in accordance with a determination that the entry field is not a credential entry field, displaying the restricted resource without displaying the credential-assistance user interface.

11. The non-transitory computer-readable storage medium of claim 9, wherein determining whether the entry field is a credential entry field is based on markup language associated with the entry field.

12. The non-transitory computer-readable storage medium of claim 9, the one or more programs further including instructions for:
receiving a second input corresponding to selection of a credential affordance; and
in response to receiving the second input, displaying a credential-assistance user interface, wherein the credential-assistance user interface includes one or more of an identifier associated with a stored credential and an option to generate a new password.

* * * * *